United States Patent
Xu et al.

(10) Patent No.: US 12,316,458 B2
(45) Date of Patent: May 27, 2025

(54) HYBRID AUTOMATIC REPEAT REQUEST PROCESSING METHOD AND COMMUNICATIONS APPARATUS

(71) Applicant: HUAWEI TECHNOLOGIES CO., LTD., Guangdong (CN)

(72) Inventors: Haibo Xu, Beijing (CN); Jun Wang, Shanghai (CN); Dongdong Wei, Shanghai (CN); Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 415 days.

(21) Appl. No.: 17/774,882

(22) PCT Filed: Nov. 6, 2020

(86) PCT No.: PCT/CN2020/127164
§ 371 (c)(1),
(2) Date: May 6, 2022

(87) PCT Pub. No.: WO2021/088991
PCT Pub. Date: May 14, 2021

(65) Prior Publication Data
US 2022/0416950 A1    Dec. 29, 2022

(30) Foreign Application Priority Data
Nov. 8, 2019  (CN) .......................... 201911090520.5

(51) Int. Cl.
*H04L 1/18*    (2023.01)
*H04L 1/1812*  (2023.01)
(Continued)

(52) U.S. Cl.
CPC .......... *H04L 1/1812* (2013.01); *H04W 72/23* (2023.01); *H04W 92/18* (2013.01)

(58) Field of Classification Search
CPC .... H04L 1/1812; H04L 1/1896; H04W 72/23; H04W 92/18
See application file for complete search history.

(56) References Cited

U.S. PATENT DOCUMENTS

2018/0287744 A1   10/2018   Sundararajan et al.
2019/0222360 A1    7/2019   Nam et al.
(Continued)

FOREIGN PATENT DOCUMENTS

CN    108574564 A    9/2018
CN    109075908 A   12/2018
(Continued)

OTHER PUBLICATIONS

R1-1910048, Huawei et al., Transmission with configured grant in NR unlicensed band, 3GPP TSG RAN WG1 Meeting #98bis, Chongqing, China, Oct. 14-20, 2019, 22 pages.
(Continued)

*Primary Examiner* — Shukri Taha

(57) ABSTRACT

Embodiments of this application provide a method and a communications apparatus for hybrid automatic repeat request processing, and relate to the field of communications technologies, to help reduce the possibility that an exception occurs due to the introduction of a HARQ feedback mechanism in sidelink communication. The method includes: A first terminal device receives first sidelink grant information, a first HARQ process identifier (ID), and first indication information from a network device. If the first indication information indicates retransmission and a transport block corresponding to a first HARQ process has been successfully sent, the first terminal device ignores the first sidelink grant information.

20 Claims, 21 Drawing Sheets

(51) Int. Cl.
*H04W 72/23* (2023.01)
*H04W 92/18* (2009.01)

(56) References Cited

U.S. PATENT DOCUMENTS

2020/0396024 A1* 12/2020 Ganesan ............... H04L 1/1819
2022/0338205 A1* 10/2022 Lee ....................... H04W 72/56

FOREIGN PATENT DOCUMENTS

| CN | 109792326 A | 5/2019 |
| CN | 110381599 A | 10/2019 |
| WO | 2021031912 A1 | 2/2021 |

OTHER PUBLICATIONS

R2-1913701, Huawei et al., Discussion on HARQ support for NR sidelink, 3GPP TSG-RAN WG2 #107bis, Chongqing, China, Oct. 14-18, 2019, 17 pages.
R1-1910145, Lenovo et al., Discussion on resource allocation for NR sidelink Mode 1, 3GPP TSG RAN WG1 #98bis, Chongqing, China, Oct. 14-20, 2019, 8 pages, XP051808446.
3GPP TS 38.212 V15.7.0 (Sep. 2019), 3rd Generation Partnership Project; Technical Specification Group Radio Access Network; NR; Multiplexing and channel coding(Release 15), total 101 pages.
R2-1905678, revision of R2-1903788, Spreadtrum Communications, Discussion on HARQ procedure for mode-1 Sidelink Communication, 3GPP TSG-RAN WG2 Meeting #106, Reno, USA, May 13-17, 2019, 2 pages, XP051729178.
3GPP TS 38.213 V15.7.0 (Sep. 2019), 3rd Generation Partnership Project; Technical Specification Group Radio Access Network; NR; Physical layer procedures for control (Release 15), total 108 pages.
3GPP TS 38.214 V15.7.0 (Sep. 2019), 3rd Generation Partnership Project;Technical Specification Group Radio Access Network; NR; Physical layer procedures for data (Release 15), total 106 pages.
3GPP TS 38.321 V15.7.0 (Sep. 2019), 3rd Generation Partnership Project;Technical Specification Group Radio Access Network; NR; Medium Access Control (MAC) protocol specification (Release 15), total 78 pages.
3GPP TS 38.331 V15.7.0 (Sep. 2019), 3rd Generation Partnership Project;Technical Specification Group Radio Access Network; NR; Radio Resource Control (RRC) protocol specification (Release 15), total 527 pages.
International Search Report and Written Opinion issued in PCT/CN2020/127164, dated Feb. 1, 2021, 9 pages.
Extended European Search Report issued in EP20883864.9, dated Oct. 19, 2022, 10 pages.
Office Action issued in CN201911090520.5, dated Dec. 1, 2021, 8 pages.
3GPP TSG RAN WG1 #98bis, R1-1911105, Mode 1 Resource allocation for NR-V2X,Qualcomm Incorporated, Oct. 14-20, 2019, total 5 pages.
Office Action issued in KR2022-7015847, dated Oct. 16, 2024 with English translation, 10 pages.

* cited by examiner

HYBRID AUTOMATIC REPEAT REQUEST PROCESSING METHOD AND COMMUNICATIONS APPARATUS

CROSS-REFERENCE TO RELATED APPLICATIONS

This application is a National Stage of International Application No. PCT/CN2020/127164, filed on Nov. 6, 2020, which claims priority to Chinese Patent Application No. 201911090520.5, filed on Nov. 8, 2019, both of which are hereby incorporated by reference in their entireties.

TECHNICAL FIELD

This application relates to the field of communications technologies, and in particular, to a hybrid automatic repeat request processing method and a communications apparatus.

BACKGROUND

In a communications system, to improve reliability of data transmission, a hybrid automatic repeat request (HARQ) mechanism is introduced. However, for communication between terminals in a next generation wireless (new radio, NR) communications system, when a transport block is successfully sent or received, if some devices (for example, a receive terminal or a transmit terminal) in devices in communication determine that the transport block has been successfully sent, but some devices (for example, a network device or a transmit terminal) determine that the transport block fails to be sent, a communication exception likely occurs.

SUMMARY

Embodiments of this application provide a hybrid automatic repeat request processing method and a communications apparatus, to help reduce the possibility that an exception occurs due to introduction of a HARQ feedback mechanism in sidelink communication.

According to a first aspect, a hybrid automatic repeat request processing method is provided, including: After receiving first control information sent by a network device, a first terminal device ignores first sidelink grant information if first indication information indicates retransmission and the first terminal device has successfully sent a transport block corresponding to a first HARQ process to a second terminal device. The first control information includes the first sidelink grant information and first HARQ information. The first sidelink grant information indicates a resource used for sidelink communication. The first HARQ information includes a first HARQ process identifier (ID) and the first indication information. The first HARQ process ID is used to indicate the first HARQ process.

Based on the foregoing technical solution, when the first terminal device has successfully sent the transport block corresponding to the first HARQ process to the second terminal device, if the first terminal device receives the first control information that is sent by the network device to schedule retransmission of the transport block corresponding to the first HARQ process, the first terminal device ignores the first sidelink grant information, that is, the first terminal device does not retransmit the transport block corresponding to the first HARQ process to the second terminal device, so that the first terminal device can be prevented from performing unnecessary transmission, and the second terminal device can be prevented from providing unnecessary HARQ feedback.

In an example embodiment, if the first indication information indicates retransmission and the first terminal device has successfully sent the transport block corresponding to the first HARQ process to the second terminal device, the first terminal device further sends second indication information to the network device. The second indication information is used to indicate that the transport block corresponding to the first HARQ process has been successfully sent.

The foregoing technical solution may help reduce the possibility that the network device schedules retransmission of the transport block corresponding to the first HARQ process, and increase utilization of the first HARQ process.

According to a second aspect, another hybrid automatic repeat request processing method is provided, including:

A first terminal device receives first sidelink information sent by a first HARQ process of a second terminal device. If first indication information indicates retransmission and the first terminal device has successfully received a first transport block from the first HARQ process, the first terminal device does not decode the first transport block. The first sidelink information includes first sidelink control information and the first transport block. The first sidelink control information includes first HARQ information. The first HARQ information includes a first HARQ process ID and the first indication information. The first HARQ process ID is used to indicate the first HARQ process.

Based on the foregoing solution, when the first terminal device has successfully received the first transport block from the first HARQ process, if the first terminal device receives the first transport block retransmitted by the second terminal device, the first terminal device does not decode the retransmitted first transport block, thereby helping avoid an exception of the first terminal device, and improving communication performance of the first terminal device.

According to a third aspect, a communications apparatus is provided. The communications apparatus may be a terminal, a chip in a terminal, or a system on chip. The communications apparatus includes a processor and a memory. The memory stores computer program instructions. When the computer program instructions are executed by the processor, the communications apparatus is enabled to perform operations comprising: After receiving first control information sent by a network device, ignoring the first sidelink grant information if first indication information indicates retransmission and a transport block corresponding to a first HARQ process has been successfully sent. The first control information includes the first sidelink grant information and first HARQ information. The first sidelink grant information indicates a resource used for sidelink communication. The first HARQ information includes a first HARQ process identifier (ID) and the first indication information. The first HARQ process ID is used to indicate the first HARQ process.

According to a fourth aspect, a communications apparatus is provided. The communications apparatus may be a network device, a chip in a network device, or a system on chip. The communications apparatus includes a processor and a memory. The memory stores computer program instructions. When the computer program instructions are executed by the processor, the communications apparatus is enabled to perform operations comprising: receiving first sidelink information sent by a first HARQ process of a second terminal device. If first indication information indicates retransmission and a first transport block has been successfully received from the first HARQ process, the communications apparatus does not decode the first transport block. The first sidelink information includes first sidelink control information and the first transport block. The first sidelink control information includes first HARQ information. The first HARQ information includes a first HARQ process ID and the first indication information. The first HARQ process ID is used to indicate the first HARQ process.

According to a fifth aspect, a communications apparatus is provided. The communications apparatus includes a processing module and a communications module. The communications module is configured to receive first control information sent by a network device. The first control information includes first sidelink grant information and first HARQ information. The first sidelink grant information indicates a resource used for sidelink communication. The first HARQ information includes a first HARQ process identifier (ID) and first indication information. The first HARQ process ID is used to indicate the first HARQ process. The processing module is configured to ignore the first sidelink grant information if the first indication information indicates retransmission and the communications module has successfully sent a transport block corresponding to the first HARQ process to a second terminal device.

According to a sixth aspect, a communications apparatus is provided. The communications apparatus includes a processing module and a communications module. The communications module is configured to receive first sidelink information sent by a first HARQ process of a second terminal device. The first sidelink information includes first sidelink control information and a first transport block. The processing module is configured to skip decoding the first transport block if first indication information indicates retransmission and the communications module has successfully received the first transport block from the first HARQ process.

The first sidelink control information includes first HARQ information. The first HARQ information includes a first HARQ process ID and the first indication information. The first HARQ process ID is used to indicate the first HARQ process.

According to a seventh aspect, a computer-readable storage medium is provided. The computer-readable storage medium stores instructions. When the instructions are run on a computer, the computer is enabled to perform the method in any embodiments of either of the foregoing aspects.

According to an eighth aspect, a computer program product including instructions is provided. When the computer program product is run on a computer, the computer is enabled to perform the method in any embodiment of either of the foregoing aspects.

According to a ninth aspect, a chip is provided. The chip includes a processor, and when the processor executes instructions, the processor is configured to perform the method in any embodiment of either of the foregoing aspects. The instructions may be from a memory inside the chip, or may be from a memory outside the chip. For example, the chip further includes an input/output circuit.

For technical effects brought by any embodiment in the third aspect to the ninth aspect, refer to technical effects brought by the foregoing corresponding methods.

DESCRIPTION OF EMBODIMENTS

Figure 1:
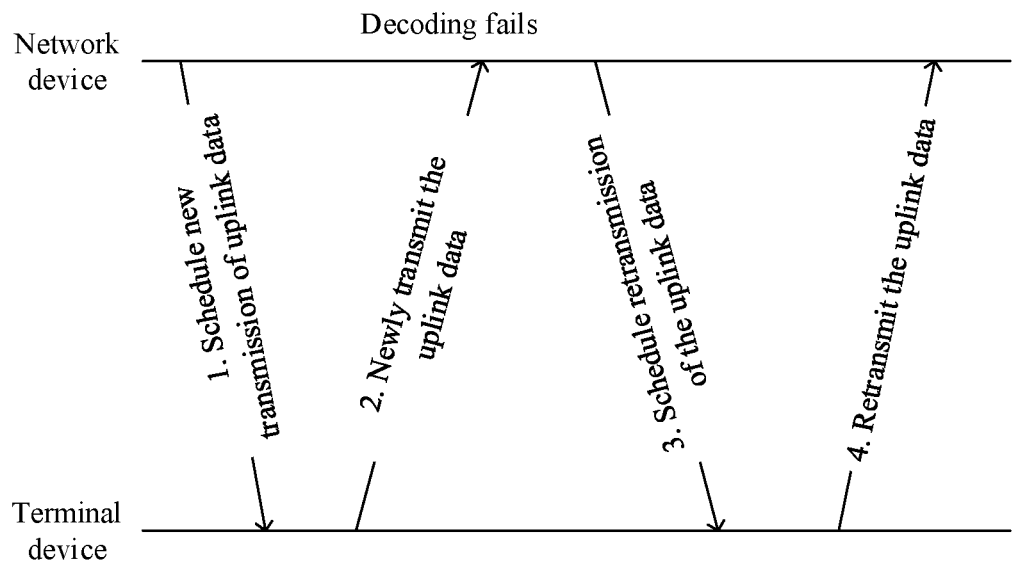
FIG. 1 is a schematic flowchart of an example uplink data retransmission feedback method.

In the present disclosure, "at least one" means one or more, and "a plurality of" means two or more than two. "At least one of the following" or a similar expression thereof indicates "any combination of the following", and includes "any combination of one or more of the following". For example, at least one of a, b, or c may indicate: a, b, c, a and b, a and c, b and c, or a, b, and c, where each of a, b, and c may be an element, or may be a set of one or more elements. The character "/" generally represents an "or" relationship between associated objects. The term "and/or" describes an association relationship for describing associated objects and represents that three relationships may exist. For example, A and/or B may represent the following three cases: Only A exists, both A and B exist, and only B exists. A and B may be singular or plural.

In the present disclosure, "example", "in some embodiments", "in another embodiment", and the like are used to represent an example, an illustration, or a description. Any embodiment or design described as an "example" in this application should not be explained as being more preferred or having more advantages than another embodiment or design. Exactly, the term "example" is used to present a concept in a specific manner.

In the present disclosure, "of", "relevant", and "corresponding" may be interchangeably used sometimes. It should be noted that meanings expressed by the terms are consistent when differences are not emphasized.

It should be noted that, in the present disclosure, the terms "first", "second", and the like are only used for a purpose of description, and cannot be understood as indicating or implying relative importance or a sequence. In the embodiments of this application, communication and transmission may be interchangeably used sometimes. It should be noted that meanings expressed by the terms are consistent when differences are not emphasized. For example, transmission may include sending and/or receiving, and may be a noun or a verb.

In the present disclosure, "equal to" may be used together with "greater than", and this is applicable to a technical solution used when "greater than" is used; or "equal to" may be used together with "less than", and this is applicable to a technical solution used when "less than" is used. It should be noted that, when "equal to" is used together with "greater than", "equal to" is not used together with "less than", or when "equal to" is used together with "less than", "equal to" is not used together with "greater than".

The following describes some terms in the embodiments of this application, to facilitate understanding by a person skilled in the art.

1. Terminal device: In the embodiments of this application, the terminal device is a device that has a wireless transceiver function, and may be referred to as a terminal, user equipment (UE), a mobile station (MS), a mobile terminal (MT), or the like. For example, a specific form of the terminal device in the embodiments of this application may be a mobile phone, a tablet computer (pad), a desktop computer, a notebook computer, an all-in-one machine, a vehicle-mounted terminal, a virtual reality (VR) terminal device, an augmented reality (AR) terminal device, a transport means (such as a bicycle, a car, an airplane, or a ship), a wireless terminal in industrial control, a wireless terminal (such as a self-driving car) in self-driving, a wireless terminal in remote surgery, a wireless terminal in smart grid, a wireless terminal in transportation safety, a wireless terminal in smart city, a wireless terminal in smart home, a cellular phone, a cordless phone, a session initiation protocol (SIP) phone, a wireless local loop (WLL) station, a personal digital assistant (PDA), a wearable device, a terminal device in a future mobile communications network, or a terminal device in a future evolved public land mobile network (PLMN). It should be noted that the terminal device may support at least one wireless communications technology, for example, long term evolution (LTE), NR, or a future communications technology.

2. Network device: In the embodiments of this application, the network device is a device that provides a wireless access function for a terminal device, and may also be referred to as an access network device, a radio access network (RAN) device, or the like. The network device may support at least one wireless communications technology, for example, LTE, NR, or a future communications technology. For example, the network device includes but is not limited to: a next-generation NodeB (generation NodeB, gNB) in a fifth-generation mobile communications system (5th-generation, 5G), an evolved NodeB (evolved node B, eNB), a radio network controller (RNC), a NodeB (node B, NB), a base station controller (BSC), a base transceiver station (BTS), a home base station (for example, home evolved node B or home node B, HNB), a baseband unit (BBU), a transmission reception point (TRP), a transmission point (TP), a mobile switching center, a small cell, and a pico cell. Alternatively, the network device may be a radio controller, a centralized unit (CU), and/or a distributed unit (DU) in a cloud radio access network (CRAN) scenario, or the network device may be a relay station, an access point, a vehicle-mounted device, a terminal device, a wearable device, a network device in future mobile communications network, a network device in a future evolved public land mobile network (PLMN), or the like.

3. Communication between a terminal device and a network device: In the embodiments of this application, the terminal device and the network device communicate with each other through a communications interface. For example, the communications interface between the terminal device and the network device may be a universal UE to network interface (Uu interface). Therefore, communication between the terminal device and the network device may also be referred to as Uu interface communication. Specifically, Uu interface communication includes uplink communication and downlink communication.

Specifically, uplink communication refers to a process in which the terminal device sends information to the network device. The information sent by the terminal device to the network device may be referred to as an uplink signal, uplink information, or the like. It may be understood that the uplink information usually includes uplink control information (UCI) and uplink data. The uplink control information is used to carry related information fed back by the terminal device, for example, channel state information (CSI) or HARQ feedback information (for example, an acknowledgement (ACK), or a negative acknowledgement (NACK)). Specifically, the uplink control information may be carried on a physical uplink control channel (PUCCH), and the uplink data may be carried on a physical uplink shared channel (PUSCH).

Specifically, downlink communication refers to a process in which the terminal device receives information sent by the network device. The information received by the terminal device from the network device may be referred to as a downlink signal or downlink information. It may be understood that the downlink information usually includes downlink control information (DCI) and downlink data. The downlink control information is related information used to schedule communication (Uu interface communication, sidelink communication, or the like) for the terminal device, for example, information such as data channel resource allocation and a modulation and coding scheme. Specifically, the downlink control information may be carried on a physical downlink control channel (PDCCH), and the downlink data may be carried on a physical downlink shared channel (PDSCH).

4. Sidelink communication: In the embodiments of this application, sidelink communication may also be referred to as sidelink communication, and is communication between terminal devices, including sending and receiving of sidelink information. The sidelink information may also be referred to as a sidelink signal, and includes sidelink control information (SCI) and sidelink data. The SCI is usually carried on a physical sidelink control channel (PSCCH). The sidelink data is usually carried on a physical sidelink shared channel (PSSCH). In addition, the sidelink information further includes sidelink feedback control information (SFCI), which may be referred to as sidelink feedback information. For example, the SFCI may include one or more of information such as channel state information (CSI) and hybrid automatic repeat request (HARQ) feedback information. The HARQ feedback information may include an ACK, a NACK, or the like. Specifically, the HARQ feedback information may be carried on a physical sidelink feedback channel (PSFCH). The PSFCH may also be referred to as a sidelink feedback channel.

For example, in the embodiments of this application, an interface used by the terminal device for sidelink communication may be referred to as a PC5 interface. A resource used for sidelink communication may also be referred to as a sidelink resource, and specifically includes a time domain resource and a frequency domain resource.

For different communication scenarios, sidelink communication includes vehicle-to-X (V2X) communication, device-to-device (D2D) communication, and the like. In addition, for different manners of scheduling a sidelink resource, sidelink communication includes a network device scheduling mode and a terminal device autonomous selection mode. The network device scheduling mode may also be referred to as a mode 1, a network device-assisted scheduling mode, or the like. In the network device scheduling mode, a sidelink resource is allocated by a network device to the terminal device, and the sidelink resource allocated by the network device may be indicated to the terminal device by using sidelink grant (SL grant) information. For example, the network device may add the sidelink grant information to downlink control information (DCI) and send the downlink control information to the terminal device. The terminal device autonomous selection mode may also be referred to as a mode 2. In the terminal device autonomous selection mode, the terminal device autonomously determines, from a resource pool (RP), a sidelink resource used for sidelink communication. The resource pool is preconfigured for the terminal device. For example, the resource pool may be preconfigured by the network device for the terminal device by using a system message or dedicated signaling, or may be pre-agreed on by using a protocol. A manner of pre-configuring the resource pool for the terminal device is not limited in the embodiments of this application. In addition, it should be noted that the resource pool in the embodiments of this application is a group of resources used for sidelink communication.

5. Transport block: In the embodiments of this application, the transport block (TB) is data received or sent in one communication process between terminal devices or between a terminal device and a network device. It should be noted that the transport block in the embodiments of this application may be understood as a medium access control protocol data unit (MAC PDU).

6. HARQ entity: In the embodiment of this application, one HARQ entity maintains or manages K HARQ processes, to implement a HARQ feedback retransmission mechanism. K is a positive integer greater than or equal to 1. A value of K may be pre-agreed on by using a protocol, or may be configured by a network device for a terminal device. For example, the value of K may be 16.

For example, one terminal device may include M HARQ entities for sidelink communication and N HARQ entities for Uu interface communication. Generally, one communications carrier corresponds to one HARQ entity. Sidelink communication is used as an example. For example, when there is one carrier used for sidelink communication, one terminal device includes one HARQ entity for sidelink communication. For another example, when there are Q carriers used for sidelink communication, one terminal device includes Q HARQ entities for sidelink communication.

It should be noted that, for both sidelink communication and Uu interface communication, one HARQ process is used for communication of one TB. For example, a HARQ process 1 is used for communication of a TB 1, and the HARQ process 1 can be used for communication of another TB only after transmission of the TB 1 ends. Before transmission of the TB 1 ends, transmission of the another TB cannot occupy the HARQ process 1. In other words, after the HARQ process 1 is occupied for transmission of the TB 1, the HARQ process 1 cannot be used for transmission of the another TB before transmission of the TB ends. In addition, in the embodiments of this application, a HARQ process is indicated by using a HARQ process identifier (ID), and HARQ process IDs of different HARQ processes maintained by a same HARQ entity are different.

To improve reliability of data transmission in communication, a HARQ feedback retransmission mechanism is introduced. For example, in uplink communication, an uplink data retransmission feedback process is shown in FIG. 1, and includes the following steps:

Step 1: A network device schedules a terminal device for new transmission of uplink data on a PDCCH.

Step 2: The terminal device sends the uplink data to the network device based on the scheduling in step 1.

Step 3: After receiving the uplink data, the network device decodes the uplink data. If the decoding fails, the network device schedules the terminal device for retransmission of the uplink data on the PDCCH.

Step 4: The terminal device retransmits the uplink data to the network device based on the scheduling in step 3.

Figure 2:
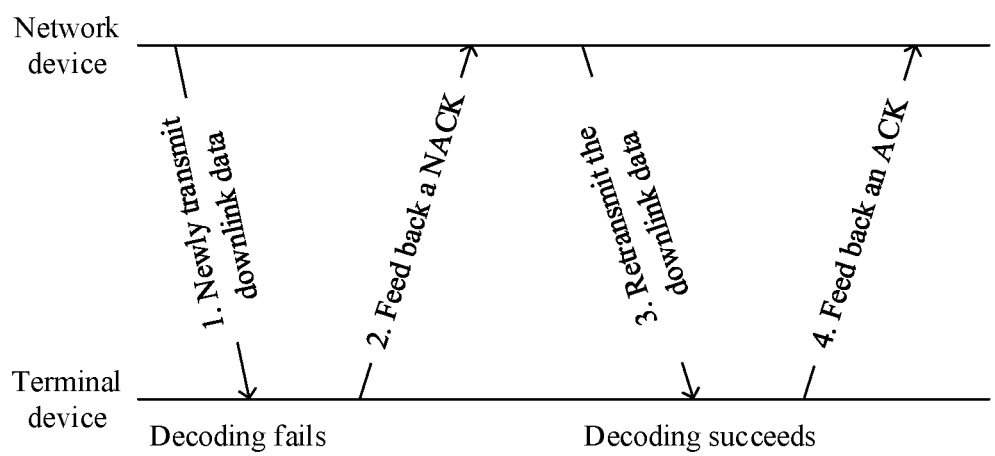
FIG. 2 is a schematic flowchart of an example downlink data retransmission feedback method.

For another example, in downlink communication, a downlink data retransmission feedback process is shown in FIG. 2, and includes the following steps:

Step 1: A network device newly transmits downlink data to a terminal device.

Step 2: The terminal device receives the downlink data newly transmitted by the network device, and decodes the downlink data. If the decoding fails, the terminal device returns a NACK to the network device.

Step 3: After receiving the NACK, the network device retransmits the downlink data to the terminal device.

Step 4: After the terminal device receives the downlink data retransmitted by the network device, if the terminal device successfully decodes the retransmitted downlink data, the terminal device returns an ACK to the network device.

In addition, for sidelink communication, a transmit terminal sends sidelink data to a receive terminal. For example, the transmit terminal is a terminal device 1, and the receive terminal is a terminal device 2. A sidelink data retransmission feedback process may be shown in FIG. 3, and may include the following steps:

The terminal device 1 sends sidelink data to the terminal device 2, including new transmission and retransmission.

After receiving the sidelink data, the terminal device 2 decodes the sidelink data. If the terminal device 2 receives, after successfully decoding the sidelink data from the terminal device 1, the sidelink data retransmitted by the terminal device 1, the terminal device 2 does not decode the sidelink data. It should be noted that, regardless of whether the terminal device 2 successfully decodes the sidelink data from the terminal device 1, the terminal device 2 does not provide ACK/NACK feedback.

Figure 3:
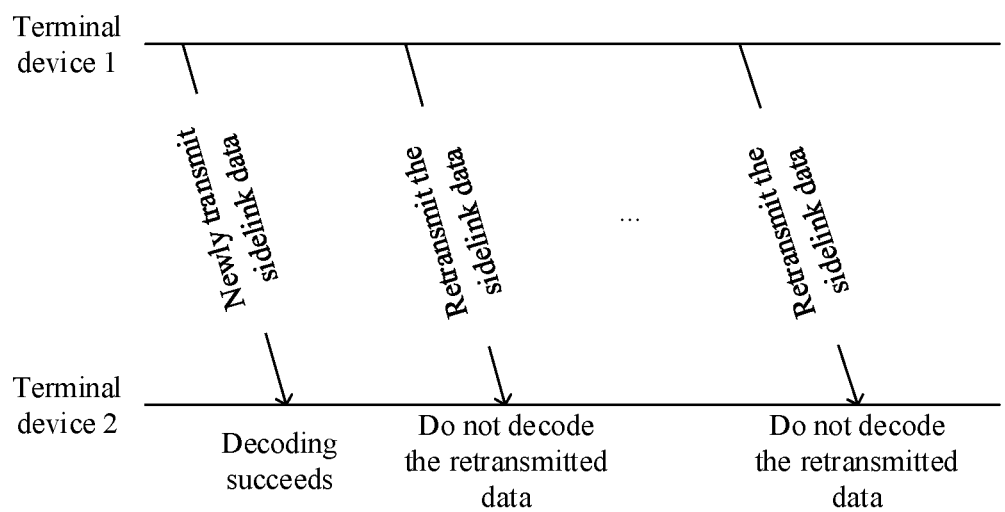
FIG. 3 is a schematic flowchart of an example sidelink communication retransmission feedback method.

Generally, the sidelink data retransmission feedback process shown in FIG. 3 is applied to LTE.

In some other embodiments, for sidelink communication, ACK/NACK feedback may alternatively be provided.

Figure 4:
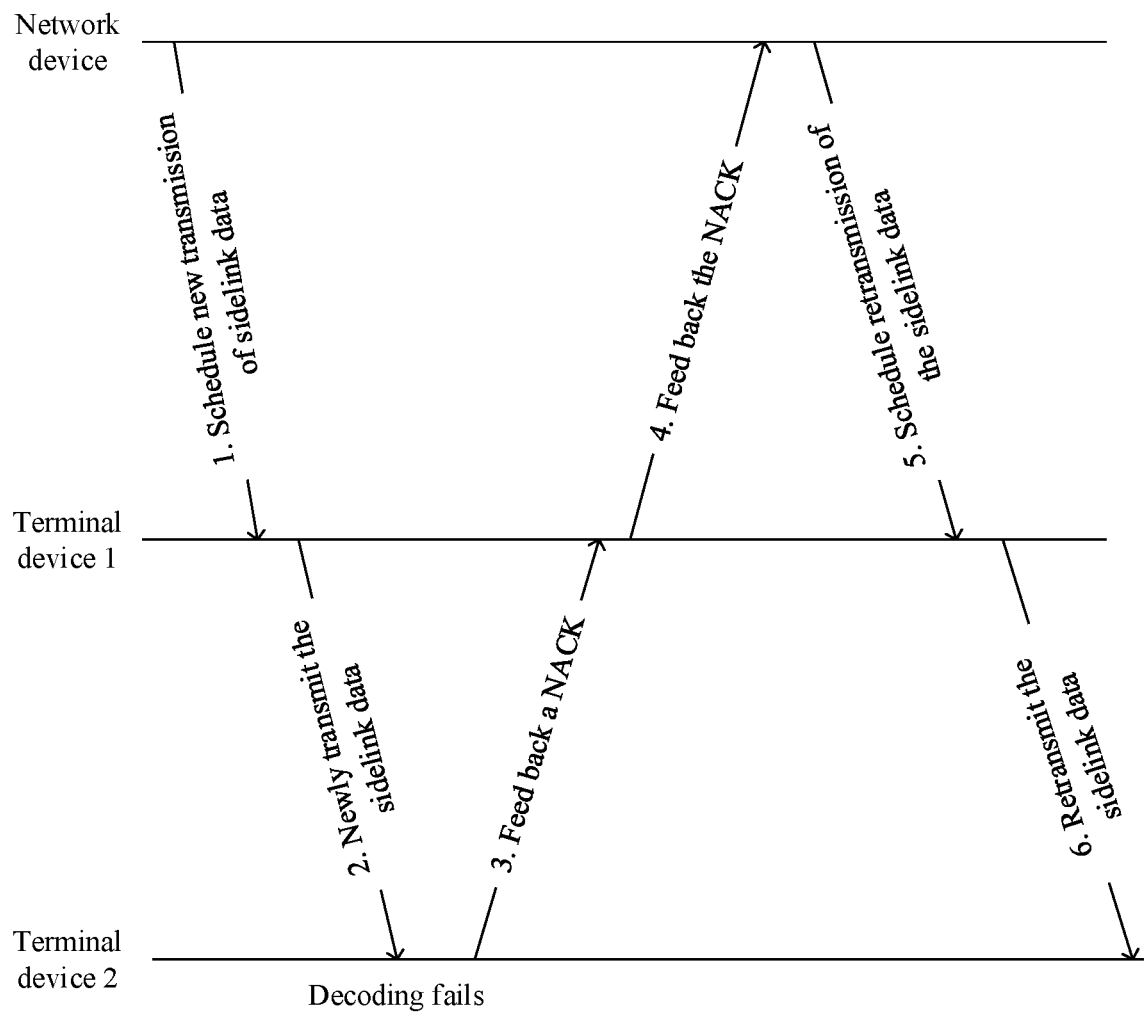
FIG. 4 is a schematic flowchart of another example sidelink communication retransmission feedback method.

For example, the transmit terminal is a terminal device 1, and the receive terminal is a terminal device 2. In a network device scheduling mode, a sidelink data retransmission feedback method may be shown in FIG. 4, and includes the following steps:

Step 1: A network device schedules the terminal device 1 for new transmission of sidelink data on a PDCCH, where a receive end of the sidelink data is the terminal device 2.

Step 2: The terminal device 1 newly transmits the sidelink data to the terminal device 2 based on the scheduling in step 1.

Step 3: After receiving the sidelink data newly transmitted by the terminal device 1, the terminal device 2 decodes the sidelink data. If the decoding fails, the terminal device 2 feeds back a NACK to the terminal device 1.

Step 4: After receiving the NACK fed back by the terminal device 2, the terminal device 1 feeds back the NACK to the network device.

Step 5: After receiving the NACK, the network device schedules the terminal device 1 for retransmission of the sidelink data on the PDCCH.

Step 6: The terminal device 1 retransmits the sidelink data to the terminal device 2 based on the scheduling in step 5.

Figure 5:
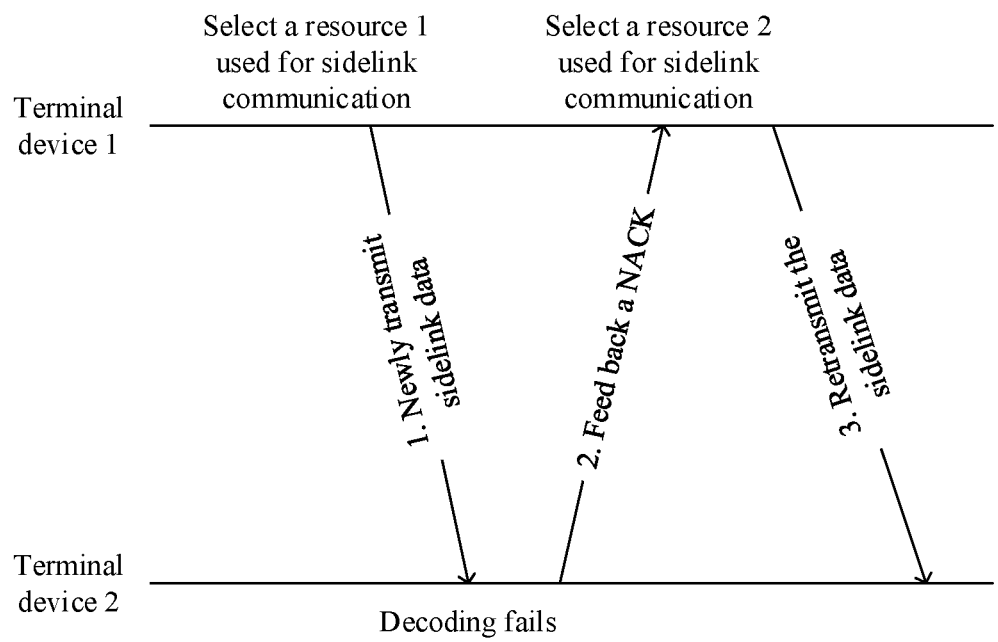
FIG. 5 is a schematic flowchart of another example sidelink communication retransmission feedback method.

For another example, the transmit terminal is a terminal device 1, and the receive terminal is a terminal device 2. In a terminal device autonomous selection mode, a sidelink data retransmission feedback method may be shown in FIG. 5, and includes the following steps:

Step 1: The terminal device 1 selects a sidelink resource 1 used to newly transmit sidelink data, and newly transmits the sidelink data to the terminal device 2 by using the selected sidelink resource 2.

Step 2: After receiving the sidelink data from the terminal device 1, the terminal device 2 decodes the sidelink data. If the decoding fails, the terminal device 2 feeds back a NACK to the terminal device 1.

Step 3: After receiving the NACK, the terminal device 1 selects a sidelink resource 2 used to retransmit the sidelink data, and retransmits the sidelink data to the terminal device 2 by using the selected sidelink resource 2 used to retransmit the sidelink data.

Generally, in the network device scheduling mode, during scheduling of the transmit terminal for sidelink data transmission, the network device may add, to the DCI, a HARQ process ID corresponding to a sidelink resource that is currently scheduled for sidelink data transmission. However, the transmit terminal may allocate a HARQ process used for sending the sidelink data on the currently scheduled sidelink resource, and does not need a HARQ process identified by using the HARQ process ID added by the network device to the DCI.

In this way, when the transmit terminal may send the sidelink data in both the network device scheduling mode and the terminal device autonomous selection mode, the HARQ process that is identified by using the HARQ process ID and that is indicated by the network device to the transmit terminal in the DCI may have been allocated for sidelink data transmission in the terminal autonomous selection mode. Therefore, in the network device scheduling mode, the transmit terminal also allocates the HARQ process used for sending the sidelink data. This helps avoid a conflict.

In addition, in the terminal device autonomous selection mode, only the transmit terminal can allocate a HARQ process used for sending the sidelink data. Therefore, in the network device scheduling mode, the transmit terminal also allocates a HARQ process used for sending the sidelink data. This helps consistency.

Moreover, it should be understood that, when sending the sidelink data to the receive terminal, the transmit terminal also sends SCI to the receive terminal. The SCI carries a HARQ process ID used in current sidelink communication. However, after receiving the sidelink data from the transmit terminal, the receive terminal may allocate a HARQ process to process the sidelink data, and does not use a HARQ process identified by using the HARQ process ID carried in the SCI.

In this way, when the transmit terminal performs sidelink communication with a plurality of receive terminals at the same time, HARQ process IDs carried in different pieces of SCI sent by different transmit terminals may be the same, and the receive terminal needs to use different HARQ processes to process sidelink data from different transmit terminals. Therefore, the receive terminal uses a HARQ process allocated by the receive terminal to process received sidelink data, so that a HARQ process conflict can be avoided.

For the foregoing case in which the receive terminal and the transmit terminal separately allocate HARQ processes to send and receive sidelink data, to improve utilization of the HARQ process, in some embodiments, when the transmit terminal receives an ACK that is fed back by the receive terminal and that is specific to the HARQ process identified by using the HARQ process ID and indicated to the receive terminal by using the SCI, the transmit terminal clears a buffer corresponding to the HARQ process (HARQ buffer), and marks the HARQ process as "available", "idle", or the like, that is, the HARQ process may be subsequently allocated for transmission of new sidelink data.

In some embodiments, when the receive terminal successfully decodes sidelink data by using a HARQ process allocated by the receive terminal, the receive terminal clears a buffer corresponding to the HARQ process (HARQ soft buffer), and marks the HARQ process as "available" or "idle", that is, the HARQ process may be subsequently allocated for decoding of newly received sidelink data.

In sidelink communication, after the HARQ feedback retransmission mechanism is introduced, the transmit terminal or the receive terminal may allocate a HARQ process, and after sidelink data is successfully sent or received, a corresponding buffer is further cleared and marked as "available" or "idle". Therefore, in the network device scheduling mode, if the network device determines that the sidelink data fails to be sent, but the transmit terminal determines that the sidelink data is successfully received, when the network device performs scheduling again for the sidelink data, an exception may occur on the transmit terminal.

For example, a terminal device 1 sends a TB 1 to a terminal device 2. It should be noted that the TB 1 is sidelink data. In a network device scheduling mode, a sidelink communication process may be shown in FIG. 6A and FIG. 6B, and may include the following steps.

Step 601: A network device sends DCI 1 to the terminal device 1 to schedule new transmission of the TB 1. The DCI 1 includes an SL grant 1, a HARQ process ID 1, and a new data indicator (NDI) 1. Herein, the NDI 1 is equal to 0, the SL grant 1 indicates a sidelink resource 1, and the HARQ process ID 1 is used to indicate a HARQ process 1.

Step 602: After receiving the DCI 1, the terminal device 1 determines, based on the HARQ process ID 1 and the NDI 1, that the NDI 1 indicates new transmission, and allocates a HARQ process A.

Step 603: The terminal device 1 newly transmits SCI 1 and the TB 1 to the terminal device 2 on the sidelink resource 1 by using the HARQ process A. The SCI 1 includes a HARQ process ID A and the NDI 1. The HARQ process ID A indicates the HARQ process A.

It should be noted that, for the terminal device 1, the HARQ process A is associated with the HARQ process 1.

In addition, it should be further noted that, that the terminal device 1 newly transmits SCI 1 and the TB 1 to the terminal device 2 on the sidelink resource 1 by using the HARQ process A may be understood as that the terminal device 1 newly transmits the SCI 1 and the TB 1 to the terminal device 2 on the sidelink resource 1 by using the HARQ process A, or the terminal device 1 newly transmits the SCI 1 and the TB 1 to the terminal device 2 on the sidelink resource 1 by using the HARQ process A.

Step 604: After the terminal device 2 receives the SCI 1 and the TB 1, if the terminal device 2 determines, based on the HARQ process ID A and the NDI 1, that the NDI 1 indicates new transmission, the terminal device 2 allocates a HARQ process Y, and decodes the TB 1 by using the HARQ process Y. For the terminal device 2, the HARQ process A is associated with a HARQ process Y.

Step 605: The terminal device 2 successfully decodes the TB 1, and sends an ACK to the terminal device 1 for the TB 1. Further, if the terminal device 2 successfully decodes the TB 1, the terminal device 2 further releases the HARQ process Y. This helps increase utilization of the HARQ process Y. For example, the terminal device 2 may mark the HARQ process Y as "available", "idle", or "unoccupied", to clear a buffer corresponding to the HARQ process, so as to remove the association relationship between the HARQ process Y and the HARQ process A, thereby releasing the HARQ process Y.

Step 606: If the terminal device 1 receives the ACK sent by the terminal device 2 for the TB 1, and determines that the TB 1 has been successfully sent, the terminal device 1 releases the HARQ process A, and sends HARQ feedback information for the TB 1 to the network device.

For example, the terminal device 1 may mark the HARQ process A as "available", "idle", or "unoccupied", to clear a buffer corresponding to the HARQ process A, so as to remove the association relationship between the HARQ process A and the HARQ process Y, thereby releasing the HARQ process A.

Step 607: The network device sends DCI 0 to the terminal device 1 to schedule new transmission of a TB 0. The DCI 0 includes an SL grant 0, a HARQ process ID 0, and the NDI 1. The HARQ process ID 0 is used to indicate a HARQ process 0, and the SL grant 0 indicates a sidelink resource 0.

Step 608: The terminal device 1 receives the DCI 0, determines, based on the HARQ process ID 0 and an NDI 0, that the NDI 0 indicates new transmission, and allocates the HARQ process A. For the terminal device 1, the HARQ process 0 is associated with the HARQ process A.

Step 609: The terminal device 1 newly transmits SCI 0 and the TB 0 to the terminal device 2 on the sidelink resource 0 by using the HARQ process A. The SCI 0 includes the HARQ process ID A and the NDI 1.

Step 610: After the terminal device 2 receives the SCI 0 and the TB 0, if the terminal device 2 determines, based on the HARQ process ID A and the NDI 1, that the NDI 1 indicates new transmission, the terminal device 2 allocates a HARQ process X, and decodes the TB 0 by using the HARQ process X. For the terminal device 2, the HARQ process A is associated with the HARQ process X.

Step 611: If the terminal device 2 fails to decode the TB 0, the terminal device 2 sends a NACK to the terminal device 1 for the TB 0.

It should be noted that, when the decoding fails, the terminal device 2 usually continues to retain the association relationship between the HARQ process A and the HARQ process X, to facilitate retransmission of the TB 0.

Step 612: If the terminal device 1 receives the NACK sent for the TB 0, the terminal device 1 determines that the TB 0 fails to be sent, and sends the NACK to the network device for the TB 0.

It should be noted that, when HARQ feedback information for the TB 0 is the NACK, the terminal device 1 usually continues to retain the association relationship between the HARQ process A and the HARQ process 0, to facilitate retransmission of the TB 0.

Step 613: After the network device allocates the HARQ process A for new transmission of the TB 0, if the network device still does not receive the HARQ feedback information for the TB 1 or fails to decode the HARQ feedback information for the TB 1, and determines that the TB 1 fails to be sent, the network device schedules retransmission of the TB 1 by sending DCI 2 to the terminal device 1. The DCI 2 includes an SL grant 2, the HARQ process ID 1, and the NDI 1. The SL grant 2 indicates a sidelink resource 2.

However, for the terminal device 1, the TB 1 has been successfully sent, and the HARQ process A allocated for the TB 1 has been occupied for transmission of the TB 0. Therefore, after the terminal device 1 receives the DCI 2 for retransmission of the TB 1 that is scheduled by the network device, an exception likely occurs.

Figure 7:
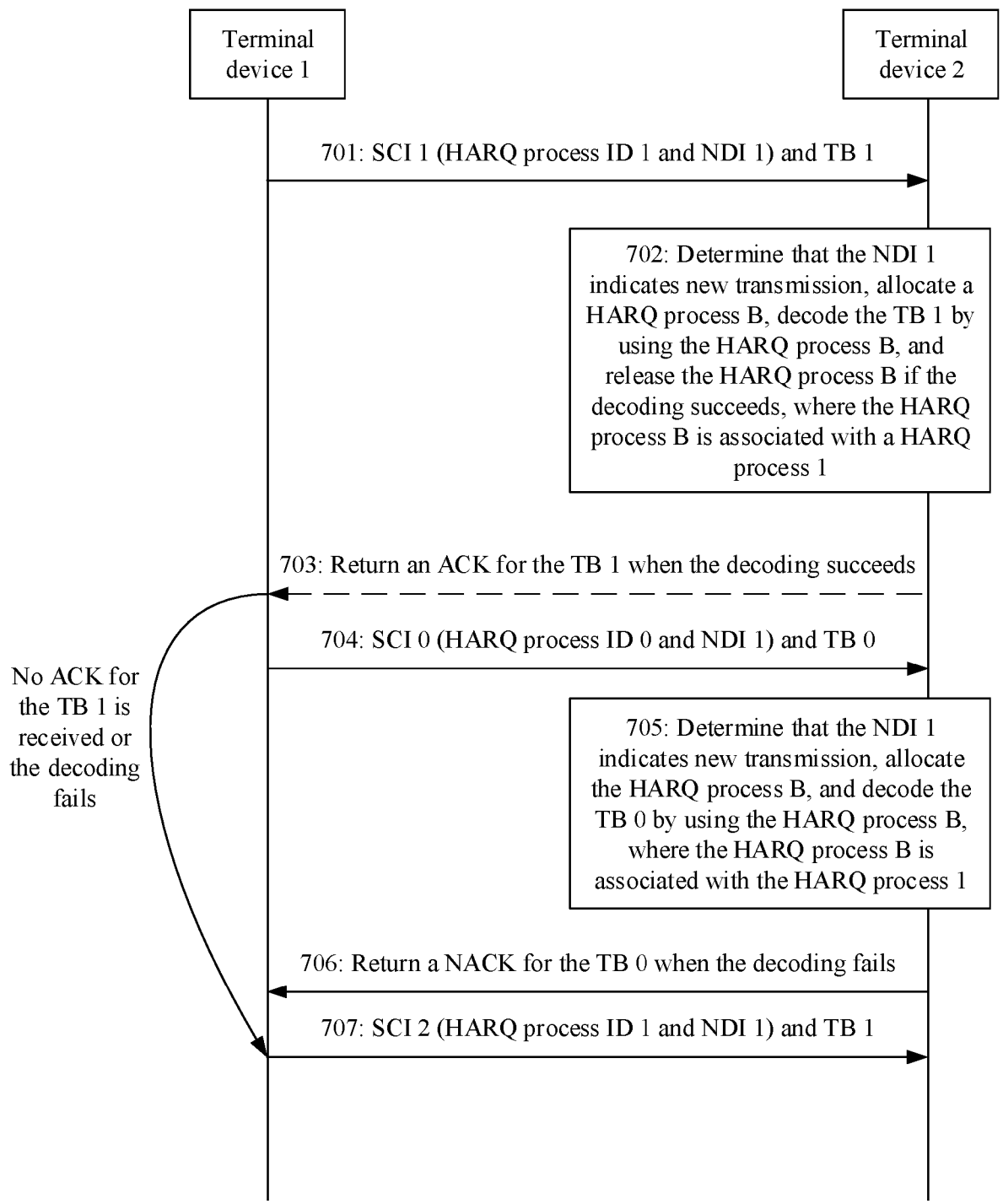
FIG. 7 is a schematic flowchart of another example sidelink communication method.

In addition, for example, a terminal device 1 sends a TB 1 to a terminal device 2. It should be noted that the TB 1 is sidelink data. In a network device scheduling mode or a terminal device autonomous selection mode, a process of communication between the terminal device 1 and the terminal device 2 may be shown in FIG. 7, and may include the following steps.

Step 701: The terminal device 1 sends SCI 1 and the TB 1 to the terminal device 2 by using a HARQ process 1. The SCI 1 includes a HARQ process ID 1 and an NDI 1. The HARQ process ID 1 is used to indicate the HARQ process 1, and the NDI 1 is equal to 0.

Step 702: After the terminal device 2 receives the SCI 1 and the TB 1, if the terminal device 2 determines, based on the HARQ process ID 1 and the NDI 1, that the NDI 1 indicates new transmission, the terminal device 2 allocates a HARQ process B, and decodes the TB 1 by using the HARQ process B. For the terminal device 2, the HARQ process 1 is associated with the HARQ process B.

Step 703: The terminal device 2 successfully decodes the TB 1, releases the HARQ process B, and sends an ACK to the terminal device for the TB 1.

Figure 6A:
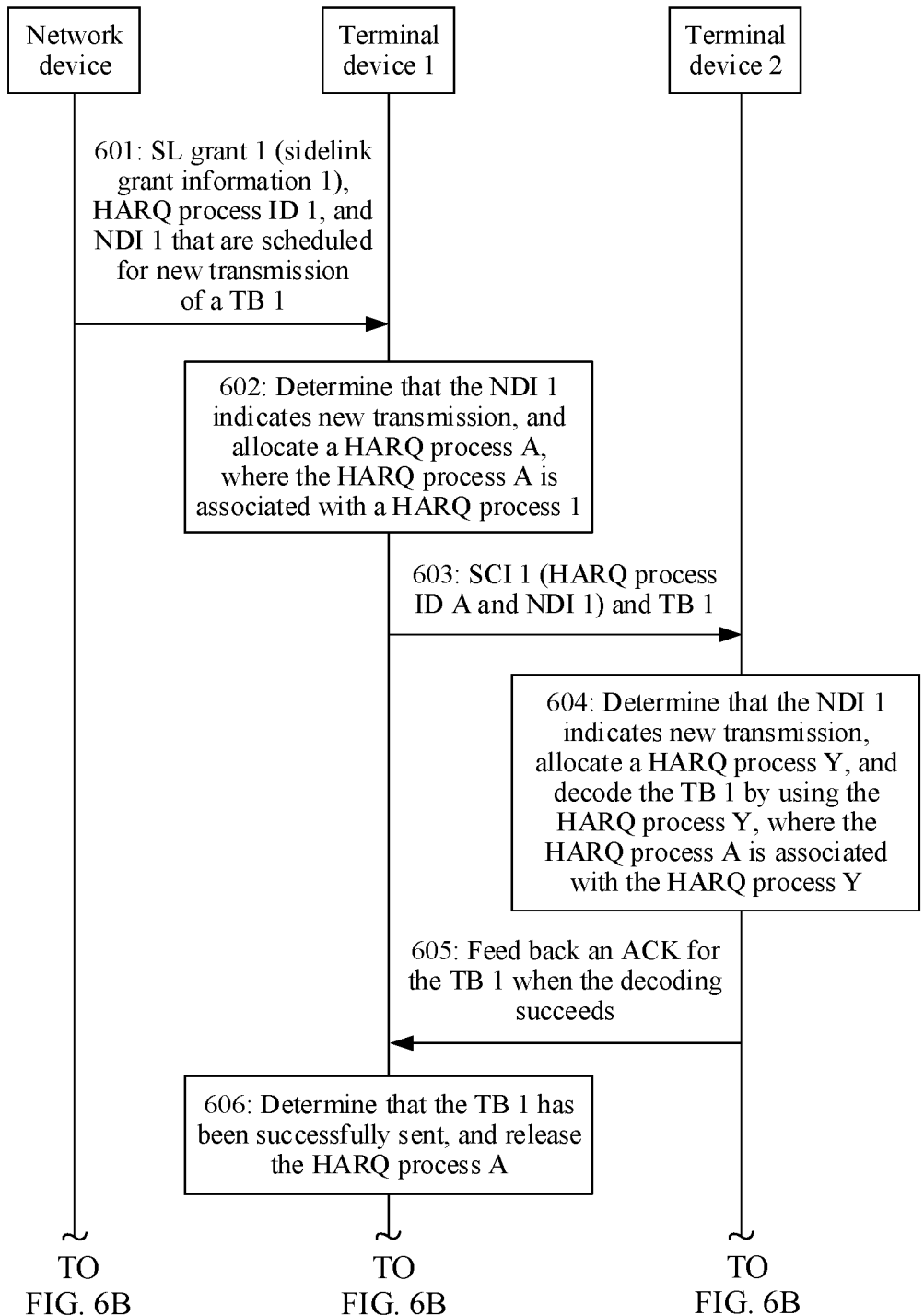
FIG. 6A and FIG. 6B are a schematic flowchart of an example sidelink communication method.
Figure 6B:
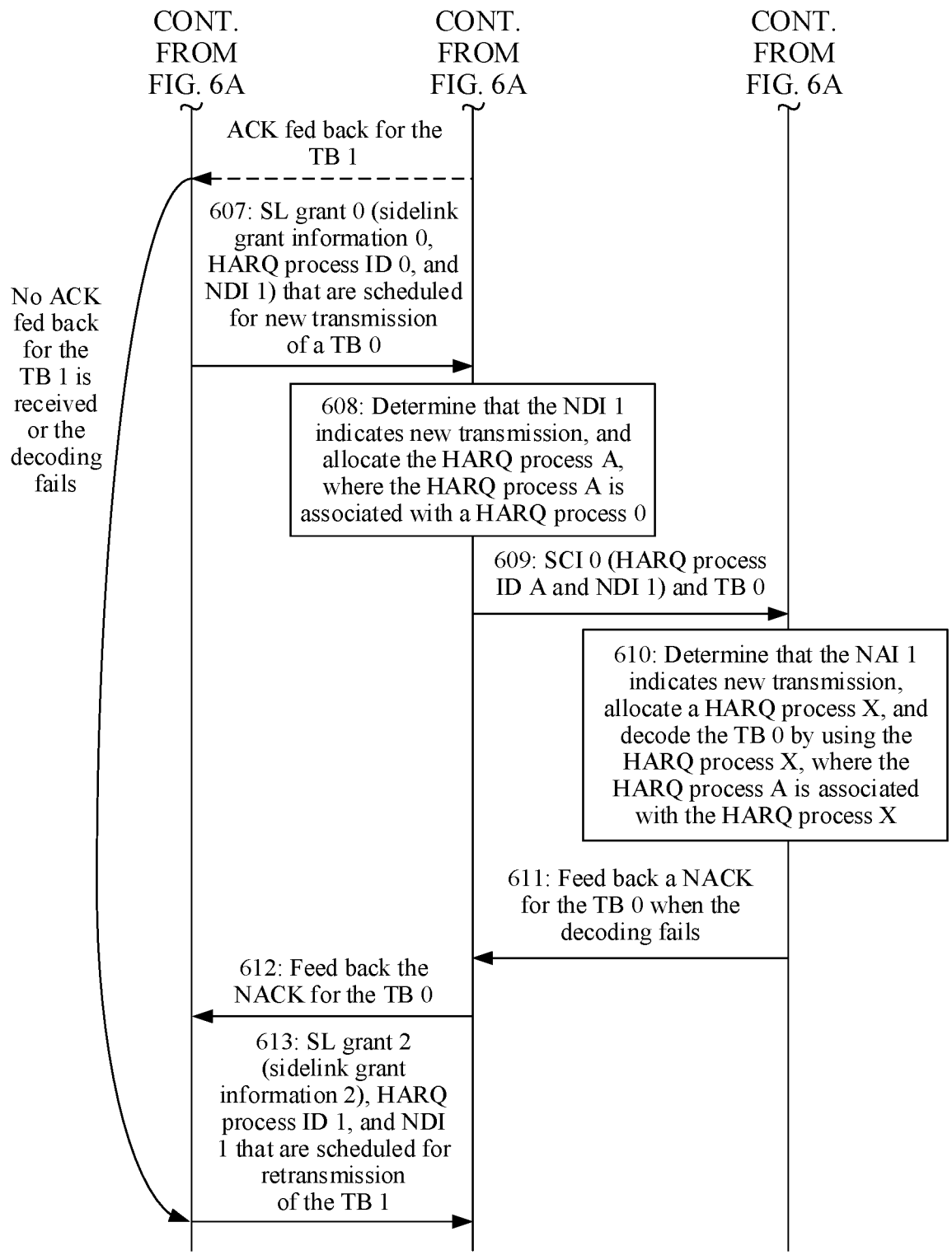

Specifically, for an implementation in which the terminal device 2 releases the HARQ process B, refer to the related description in the sidelink communication method shown in FIG. 6A and FIG. 6B.

Step 704: The terminal device 1 sends SCI 0 and a TB 0 to the terminal device 2 by using a HARQ process 0. The SCI 0 includes a HARQ process ID 0 and the NDI 1. The HARQ process ID 0 is used to indicate the HARQ process 0, and the NDI 1 is equal to 0.

Step 705: After the terminal device 2 receives the SCI 0 and the TB 0, if the terminal device 2 determines, based on the HARQ process ID 0 and the NDI 1, that the NDI 1 indicates new transmission, the terminal device 2 allocates the HARQ process B, and decodes the TB 0 by using the HARQ process B. For the terminal device 2, the HARQ process 0 is associated with the HARQ process B.

Step 706: The terminal device 2 fails to decode the TB 0, and sends a NACK to the terminal device 1 for the TB 0.

It should be noted that, when the decoding fails, the terminal device 2 usually continues to retain the association relationship between the HARQ process 0 and the HARQ process B, to facilitate retransmission of the TB 0.

Step 707: After the terminal device 1 allocates the HARQ process B for new transmission of the TB 0, if the terminal device 1 still does not receive the HARQ feedback information for the TB 1 or fails to decode the HARQ feedback information for the TB 1, and determines that the TB 1 fails to be sent, the terminal device 1 schedules retransmission of the TB 1 by sending DCI 2 to the terminal device 1. The DCI 2 includes an SL grant 2, the HARQ process ID 1, and the NDI 1. The SL grant 2 indicates a sidelink resource 2.

However, for the terminal device 2, the TB 1 has been successfully decoded, and the HARQ process B allocated for the TB 1 has been occupied for transmission of the TB 0. Therefore, after the terminal device 2 receives the DCI 2 for retransmission of the TB 1 that is scheduled by the terminal device 1, an exception likely occurs.

Therefore, in the network device scheduling mode, if a network device determines that a TB (an example in which the TB is a first TB is used below) fails to be sent, but a transmit terminal determines that the first TB is successfully sent, after the transmit terminal receives control information that is sent by the network device and that is used to schedule retransmission of the first TB, an exception likely occurs. In view of this, the embodiments of this application provide a hybrid automatic repeat request processing method, to help reduce a possibility that an exception occurs after a transmit terminal receives control information that is sent by a network device and that is used to schedule retransmission of a first TB, thereby improving communication performance.

In addition, in a network device scheduling mode and a terminal device autonomous selection mode, if a transmit terminal determines that a TB (an example in which the TB is a first TB is used below) fails to be sent, but a receive terminal determines that the first TB is successfully decoded, after the receive terminal receives the first RB retransmitted by the transmit terminal, an exception likely occurs. In view of this, the embodiments of this application further provide a hybrid automatic repeat request processing method, to help reduce a possibility that an exception occurs after a receive terminal receives a first RB retransmitted by a transmit terminal, thereby improving communication performance.

The following describes embodiments of this application correspondingly with reference to the accompanying drawings in this specification.

Figure 8:
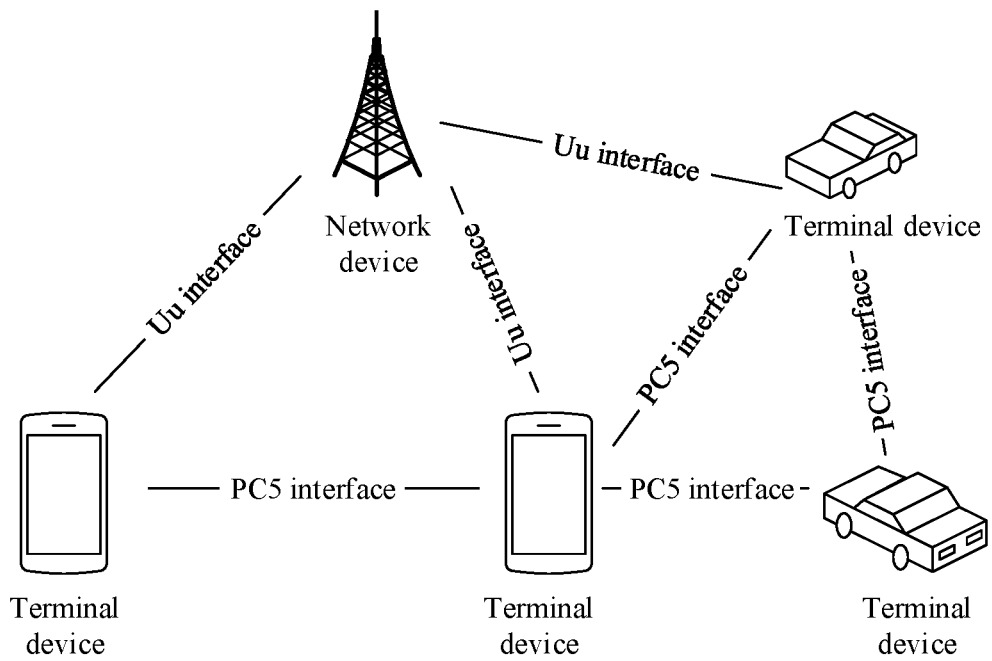
FIG. 8 is a schematic architectural diagram of a communications system to which an embodiment of this application is applicable.

The embodiments of this application may be applied to an LTE system, an NR system, or a future communications system (for example, a 6G communications system). For example, FIG. 8 is a schematic diagram of a network architecture of a communications system to which an embodiment of this application is applicable. The communications system includes a terminal device and a network device. Specifically, Uu interface communication may be performed between the terminal device and the network device, and sidelink communication may be performed between terminal devices.

In the embodiments of this application, the network device and the terminal device may be deployed on land, including an indoor or outdoor device, a handheld device, or a vehicle-mounted device; may be deployed on the water; or may be deployed on an airplane, a balloon, and an artificial satellite in the air. Deployment scenarios of the network device and the terminal device are not limited in the embodiments of this application.

It should be understood that, in the embodiments of this application, communication between the network device and the terminal device and communication between terminal devices may be performed by using a licensed spectrum, or may be performed by using an unlicensed spectrum, or may be performed by using both a licensed spectrum and an unlicensed spectrum. This is not limited. Communication between the network device and the terminal device and communication between terminal devices may be performed by using a spectrum less than 6 gigahertz (GHz), or may be performed by using a spectrum greater than or equal to 6 GHz, or may be performed by using both a spectrum less than 6 GHz and a spectrum greater than or equal to 6 GHz. That is, embodiments of this application are applicable to both a low-frequency scenario (for example, sub 6G) and a high-frequency scenario (greater than or equal to 6G). A spectrum resource used for communication between the network device and the terminal device and communication between terminal devices is not limited in the embodiments of this application.

It should be understood that the network architecture of the communications system shown in FIG. 8 is merely an example, and constitutes no limitation in the embodiments of this application. A quantity of network devices and a quantity of terminal devices in the communications system are not limited in the embodiments of this application. For example, when the communications system in the embodiments of this application includes a plurality of network devices, coordinated multipoint communication may be performed between the network devices. For example, the communications system includes a plurality of macro base stations and a plurality of micro base stations, and coordinated multipoint communication may be performed between the macro base stations, between the micro base stations, and between the macro base station and the micro base station.

Figure 9:
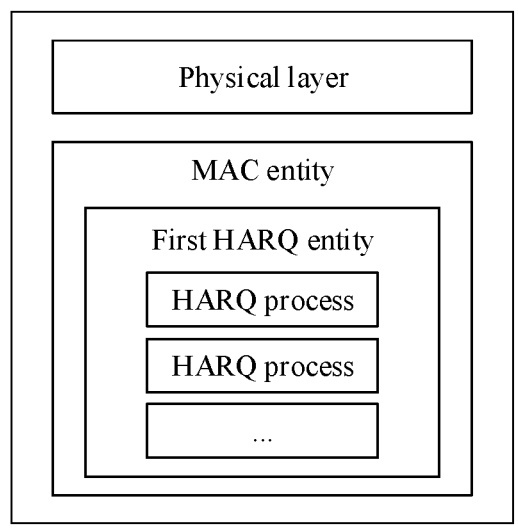
FIG. 9 is a schematic diagram of a software architecture of a terminal device according to an embodiment of this application.

For example, FIG. 9 is a schematic diagram of a software architecture of a terminal device according to an embodiment of this application. As shown in FIG. 9, the terminal device includes a physical layer and a MAC entity. The MAC entity includes a first HARQ entity, and the first HARQ entity maintains at least one HARQ process. The first HARQ entity is used for sidelink communication. In some other embodiments, the MAC entity further includes a second HARQ entity, and the second HARQ entity is used for Uu interface communication. It should be noted that, for a terminal device, a MAC entity may include at least one HARQ entity used for sidelink communication. Generally, a quantity of HARQ entities that are included in the MAC entity and that are used for sidelink communication is related to a quantity of carriers used for sidelink communication. For example, the quantity of carriers used for sidelink communication is N, and the MAC entity includes N HARQ entities used for sidelink communication.

Figure 10:
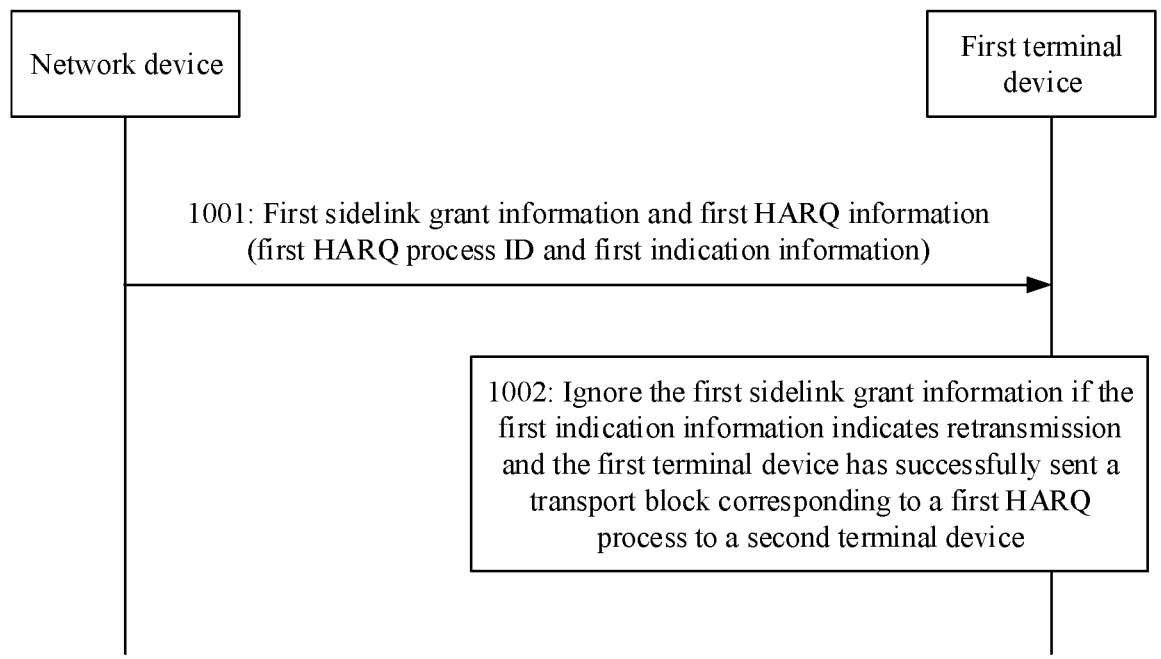
FIG. 10 is a schematic flowchart of a hybrid automatic repeat request processing method according to an embodiment of this application.

To avoid an exception occurring after a transmit terminal receives, when determining that a first TB is successfully sent, control information that is sent by a network device and that is used to schedule retransmission of the first TB, an embodiment of this application provides a hybrid automatic repeat request processing method. For example, as shown in FIG. 10, the method may include the following steps.

Step 1001: A network device sends first control information to a first terminal device. The first control information includes first sidelink grant information and first HARQ information. The first sidelink grant information indicates a first sidelink resource, and the first HARQ information includes a first HARQ process ID and first indication information. The first HARQ process ID is used to indicate a first HARQ process.

Step 1002: The first terminal device receives the first control information, and ignores the first sidelink grant information if the first indication information indicates retransmission and the first terminal device has successfully sent a transport block corresponding to the first HARQ process to a second terminal device.

That the first terminal device ignores the first sidelink grant information may be understood as that the first terminal device does not use the first sidelink resource indicated by the first sidelink grant information to send the transport block associated with the first HARQ process to the second terminal.

For example, the first indication information may also be referred to as an NDI, and may be further used to indicate new transmission. For the first HARQ process, if the NDI in the first HARQ information is not flipped, the NDI indicates retransmission, that is, the first sidelink resource indicated by the first sidelink grant information is used for retransmission of the transport block. If the NDI in the first HARQ information is flipped, the NDI indicates new transmission, that is, the first sidelink resource indicated by the first sidelink grant information is used for new transmission of the transport block. For example, for the first HARQ process, if the NDI in the first HARQ information is 0, and an NDI that has been buffered in the first terminal device for the first HARQ process is also 0, the NDI in the first HARQ information is not flipped, and the NDI in the first HARQ information indicates retransmission. For another example, for the first HARQ process, if the NDI in the first HARQ information is 1, and an NDI that has been buffered in the first terminal device for the first HARQ process is 0, the NDI is flipped, and the NDI in the first HARQ information indicates new transmission. It should be noted that the NDI that has been buffered in the first terminal device for the first HARQ process is buffered when the network device schedules the first terminal device to send the transport block corresponding to the first HARQ process before step 1001. Further, after receiving the first HARQ information, the first terminal device may update the NDI buffered for the first HARQ process to the NDI in the first HARQ information. In addition, in some other embodiments, if the first terminal device does not buffer an NDI for the first HARQ process, the NDI in the first HARQ information indicates new transmission, and then the NDI in the first HARQ information is buffered in the first terminal device.

In this embodiment of this application, when the first terminal device has successfully sent the transport block corresponding to the first HARQ process to the second terminal device, if the first terminal device receives the first control information that is sent by the network device to schedule retransmission of the transport block corresponding to the first HARQ process, the first terminal device ignores the first sidelink grant information, that is, the first terminal device does not retransmit the transport block corresponding to the first HARQ process to the second terminal device, so that the first terminal device can be prevented from performing unnecessary transmission, and the second terminal device can be prevented from performing unnecessary HARQ feedback.

For example, after receiving the first control information, the first terminal device may first determine whether the first indication information indicates retransmission, and if the first indication information indicates retransmission, determine whether the first terminal device has successfully sent the transport block corresponding to the first HARQ process to the second terminal device. If the first terminal device has successfully sent the transport block corresponding to the first HARQ process to the second terminal device, the first terminal device ignores the first sidelink grant information.

The following correspondingly describes a manner of determining whether the first terminal device has successfully sent the transport block corresponding to the first HARQ process to the second terminal device.

Manner 1: The first terminal device determines, based on a parameter value of a first parameter associated with the first HARQ process, whether the first terminal device has successfully sent the transport block corresponding to the first HARQ process to the second terminal device.

If the parameter value of the first parameter associated with the first HARQ process is a first value, the first terminal device determines that the first terminal device has successfully sent the transport block corresponding to the first HARQ process to the second terminal device. The first value is used to indicate that HARQ feedback information for the transport block corresponding to the first HARQ process is an ACK.

For another example, if the parameter value of the first parameter associated with the first HARQ process is a second value, the first terminal device determines that the first terminal device fails to send the transport block corresponding to the first HARQ process to the second terminal device. The second value is used to indicate that the HARQ feedback information for the transport block corresponding to the first HARQ process is a NACK. In this case, the first terminal device retransmits the transport block corresponding to the first HARQ process to the second terminal device on the first sidelink resource indicated by the first sidelink grant information.

It should be noted that the first value and the second value are different. For example, the first value and the second value may be different symbols, or different sequences, or different values. This is not limited. For example, the first value may be 0, and the second value may be 1. Specifically, the first value and the second value may be pre-agreed on by using a protocol.

Specifically, the first terminal device may maintain a first parameter for the first HARQ process, to record HARQ feedback information for the transport block corresponding to the first HARQ process. If the HARQ feedback information for the transport block corresponding to the first HARQ process is a NACK, a parameter value of the first parameter associated with the first HARQ process is a second value. If the HARQ feedback information for the transport block corresponding to the first HARQ process is an ACK, a parameter value of the first parameter associated with the first HARQ process is a first value.

For example, the first parameter maintained for the first HARQ process may be allocated by the first terminal device for the first HARQ process when the network device schedules the transport block corresponding to the first HARQ process for the first time, or may be preconfigured. For example, the first terminal device allocates a first parameter for the first HARQ process when the network device schedules the transport block corresponding to the first HARQ process for the first time. A parameter value of the first parameter may be a default value or null. For another example, a parameter value of a first parameter preconfigured by the device for the first HARQ process may be a default value or null. For example, the default value may be a first value, or may be a second value, or may be a third value. This is not limited. The third value is different from the first value and the second value.

Manner 2: The first terminal device determines whether the first HARQ process is associated with a HARQ process maintained by a first HARQ entity, to determine whether the first terminal device has successfully sent the transport block corresponding to the first HARQ process to the second terminal device.

The first HARQ entity is a HARQ entity that is in the first terminal device and that is used for sidelink communication. When there are a plurality of HARQ entities used for sidelink communication in the first terminal device, the first HARQ entity may be one of the plurality of HARQ entities used for sidelink communication in the first terminal device. For example, the first HARQ entity is a HARQ entity corresponding to a carrier on which the first sidelink resource indicated by the first sidelink grant information is located.

In some embodiments, the first terminal device determines whether a HARQ process associated with the first HARQ process exists in at least one occupied HARQ process maintained by the first HARQ entity. It should be noted that the at least one occupied HARQ process maintained by the first HARQ entity may be understood as an unavailable HARQ process in the at least one HARQ process maintained by the first HARQ entity, or a HARQ process that is in the at least one HARQ process maintained by the first HARQ entity and that has been allocated for sidelink communication. Therefore, a determining range is narrowed, and a processing speed of the terminal device is improved.

For example, if the first HARQ process is not associated with any HARQ process maintained by the first HARQ entity, the first terminal device determines that the first terminal device has successfully sent the transport block corresponding to the first HARQ process to the second terminal device. For example, if the first HARQ process is associated with the HARQ process maintained by the first HARQ entity, the first terminal device determines that the first terminal device has not successfully sent the transport block corresponding to the first HARQ process to the second terminal device.

It may be understood that the HARQ process associated with the first HARQ process and maintained by the first HARQ entity is a HARQ process allocated by the first terminal device to send the transport block corresponding to the first HARQ process to the second terminal device.

Manner 3: The first terminal device determines whether the first HARQ process is associated with a HARQ process maintained by a first HARQ entity. If the first HARQ process is not associated with the HARQ process maintained by the first HARQ entity, the first terminal device allocates a second HARQ process used for retransmission of the transport block corresponding to the first HARQ process. Then, the first terminal device determines whether a buffer corresponding to the second HARQ process is empty. If the buffer corresponding to the second HARQ process is empty, the first terminal device determines that the first terminal device has successfully sent the transport block corresponding to the first HARQ process to the second terminal device.

For example, the first terminal device uses the first HARQ entity to determine whether the first HARQ process is associated with the HARQ process maintained by the first HARQ entity. If the first HARQ process is not associated with the HARQ process maintained by the first HARQ entity, the first HARQ entity allocates the second HARQ process used for retransmission of the transport block corresponding to the first HARQ process, and delivers the first sidelink grant information to the second HARQ process. Then, the second HARQ process determines whether the buffer corresponding to the second HARQ process is empty. If the buffer corresponding to the second HARQ process is empty, the second HARQ process determines that the first terminal device has successfully sent the transport block corresponding to the first HARQ process to the second terminal device, and ignores the first sidelink grant information.

It may be understood that the second HARQ process is an available HARQ process, an idle HARQ process, or an unoccupied HARQ process in at least one HARQ process that is in the first terminal device and that is used for sidelink communication.

It should be noted that the foregoing three manners of determining whether the first terminal device has successfully sent the transport block corresponding to the first HARQ process to the second terminal device are merely examples for description, and constitute no limitation in the embodiments of this application.

Further, in some embodiments, if the first indication information indicates retransmission and the first terminal device has successfully sent the transport block corresponding to the first HARQ process to the second terminal device, the first terminal device sends second indication information to the network device. The second indication information is used to indicate that the transport block corresponding to the first HARQ process has been successfully sent. Therefore, after receiving the second indication information, the network device does not schedule retransmission of the transport block corresponding to the first HARQ process, so as to help avoid a resource waste.

The embodiment of this application in FIG. 10 is described in detail by using the software structure of the terminal device shown in FIG. 9 as an example.

Figure 11:
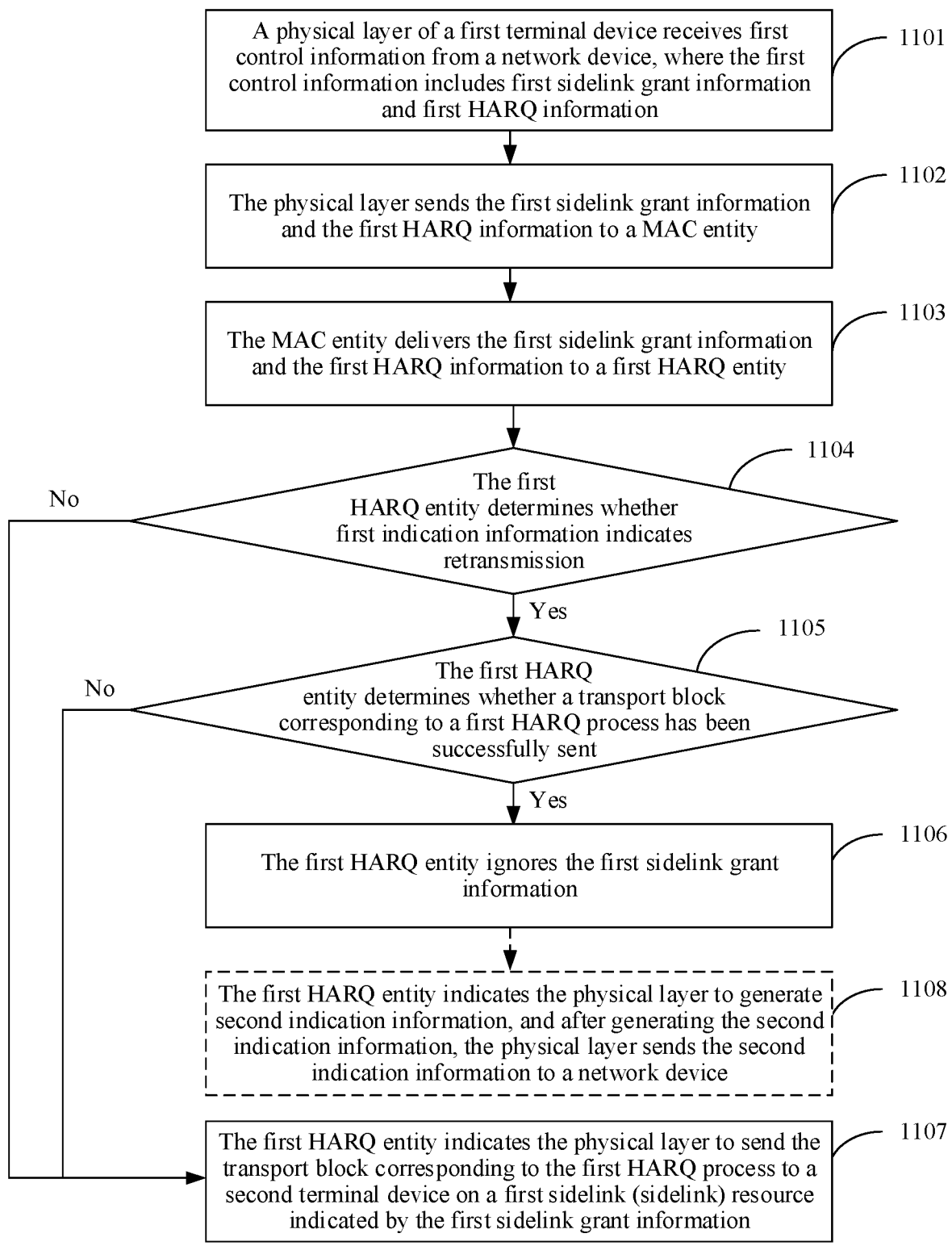
FIG. 11 is a schematic flowchart of another hybrid automatic repeat request processing method according to an embodiment of this application.

For example, FIG. 11 shows a hybrid automatic repeat request processing method according to an embodiment of this application. The method may include the following steps.

Step 1101: A physical layer of a first terminal device receives first control information from a network device. The first control information includes first sidelink grant information and first HARQ information. The first sidelink grant information indicates a first sidelink resource, and the first HARQ information includes a first HARQ process ID and first indication information. The first HARQ process ID is used to indicate a first HARQ process.

Step 1102: The physical layer sends the first sidelink grant information and the first HARQ information to a MAC entity.

Step 1103: The MAC entity delivers the first sidelink grant information and the first HARQ information to a first HARQ entity. The first HARQ entity is a HARQ entity that is in the first terminal device and that is used for sidelink communication.

Step 1104: The first HARQ entity determines, based on the first HARQ process ID and the first indication information, whether the first indication information indicates retransmission, and if yes, performs step 1105, or otherwise, performs step 1107.

Step 1105: The first HARQ entity determines whether the first terminal device has successfully sent a transport block corresponding to the first HARQ process to a second terminal device, and if yes, performs step 1106, or otherwise, performs step 1107.

For example, the first HARQ entity determines, based on a parameter value of a first parameter associated with the first HARQ process, whether the first terminal device has successfully sent the transport block corresponding to the first HARQ process to the second terminal device. For a specific implementation, refer to the related description in Manner 1. For another example, the first HARQ entity determines whether the first HARQ process is associated with a HARQ process maintained by the first HARQ entity, to determine whether the first terminal device has successfully sent the transport block corresponding to the first HARQ process to the second terminal device. For a specific implementation, refer to the related description in Manner 2.

Step 1106: The first HARQ entity ignores the first sidelink grant information.

Step 1107: The first HARQ entity indicates the physical layer to send the transport block corresponding to the first HARQ process to the second terminal device on the first sidelink resource indicated by the first sidelink grant information.

In some embodiments, when the first HARQ entity determines that the first terminal device has successfully sent the transport block corresponding to the first HARQ process to the second terminal device in step 1105, the method further includes step 1108.

Step 1108: The first HARQ entity indicates the physical layer to generate second indication information, and after generating the second indication information, the physical layer sends the second indication information to the network device. The second indication information is used to indicate that the transport block corresponding to the first HARQ process has been successfully sent.

It should be noted that step 1106 and step 1108 are not subject to a specific sequence. The first HARQ entity may perform step 1106 before step 1108, or may perform step 1108 before step 1106, or may perform step 1106 and step 1108 at the same time.

It should be noted that, in the hybrid automatic repeat request processing method shown in FIG. 11, the first HARQ entity determines whether the first indication information indicates retransmission, determines whether the first terminal device has successfully sent the transport block corresponding to the first HARQ process to the second terminal device, ignores the first sidelink grant information, and indicates the physical layer to generate the second indication information.

Figure 12:
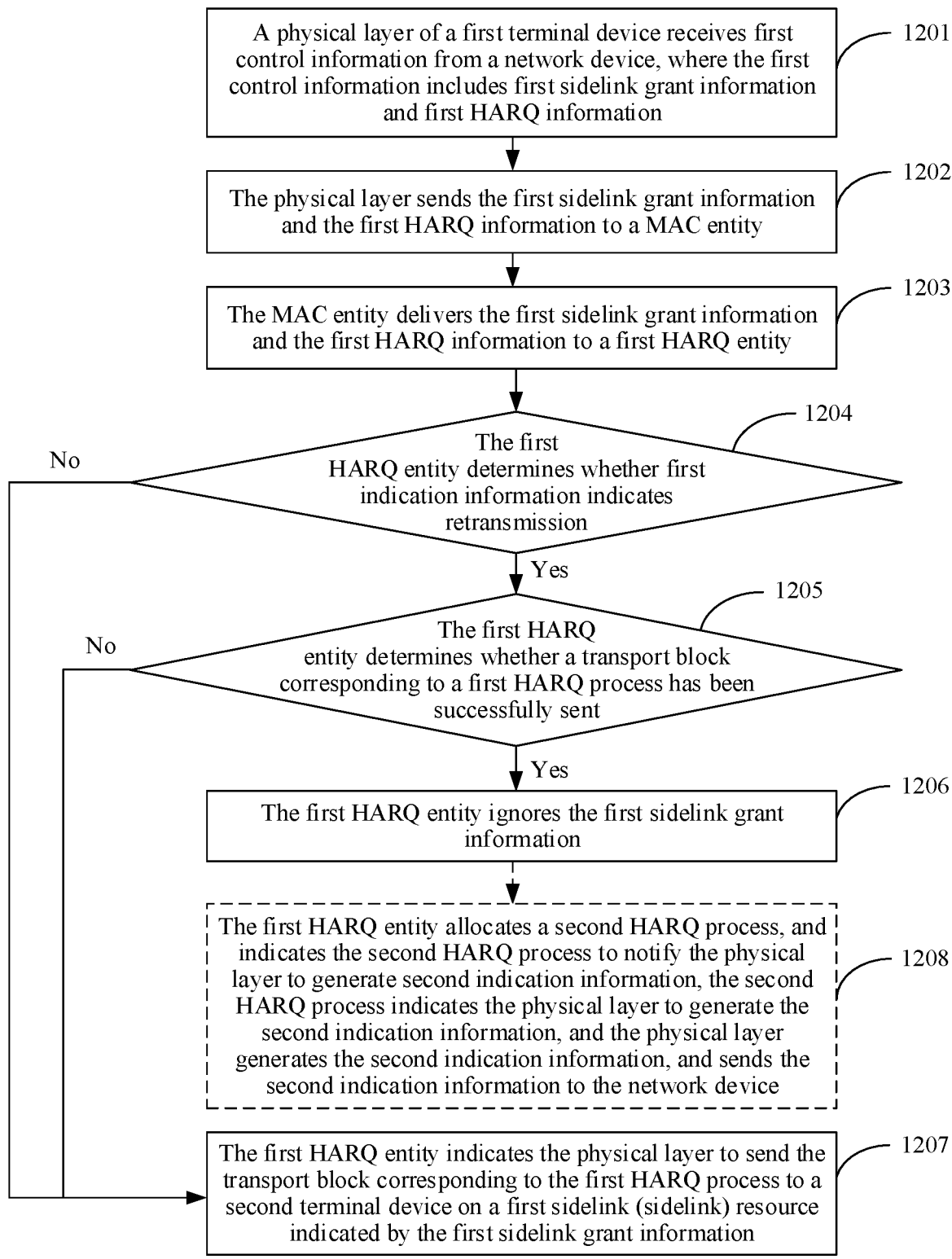
FIG. 12 is a schematic flowchart of another hybrid automatic repeat request processing method according to an embodiment of this application.

In some other embodiments, in the first terminal device, the first HARQ entity may determine whether the first indication information indicates retransmission, determine whether the first terminal device has successfully sent the transport block corresponding to the first HARQ process to the second terminal device, and ignore the first sidelink grant information, but the HARQ process maintained by the first HARQ entity indicates the physical layer to generate the second indication information. In this case, an embodiment of this application further provides a hybrid automatic repeat request processing method. For example, the method is shown in FIG. 12. Different from FIG. 11, when the first HARQ entity determines that the first terminal device has successfully sent the transport block corresponding to the first HARQ process to the second terminal device, the method further includes step 1208.

Step 1208: The first HARQ entity allocates a second HARQ process. The second HARQ process is an available HARQ process, an idle HARQ process, or an unoccupied HARQ process in at least one HARQ process maintained by the first HARQ entity. Then, the first HARQ entity indicates the second HARQ process to notify the physical layer to generate second indication information. The second HARQ process indicates the physical layer to generate the second indication information. The physical layer generates the second indication information, and sends the second indication information to the network device. The second indication information is used to indicate that the transport block corresponding to the first HARQ process has been successfully sent.

It should be noted that step 1206 and step 1208 are not subject to a specific sequence. The first HARQ entity may perform step 1206 before step 1208, or may perform step 1208 before step 1206, or may perform step 1206 and step 1208 at the same time.

Figure 13:
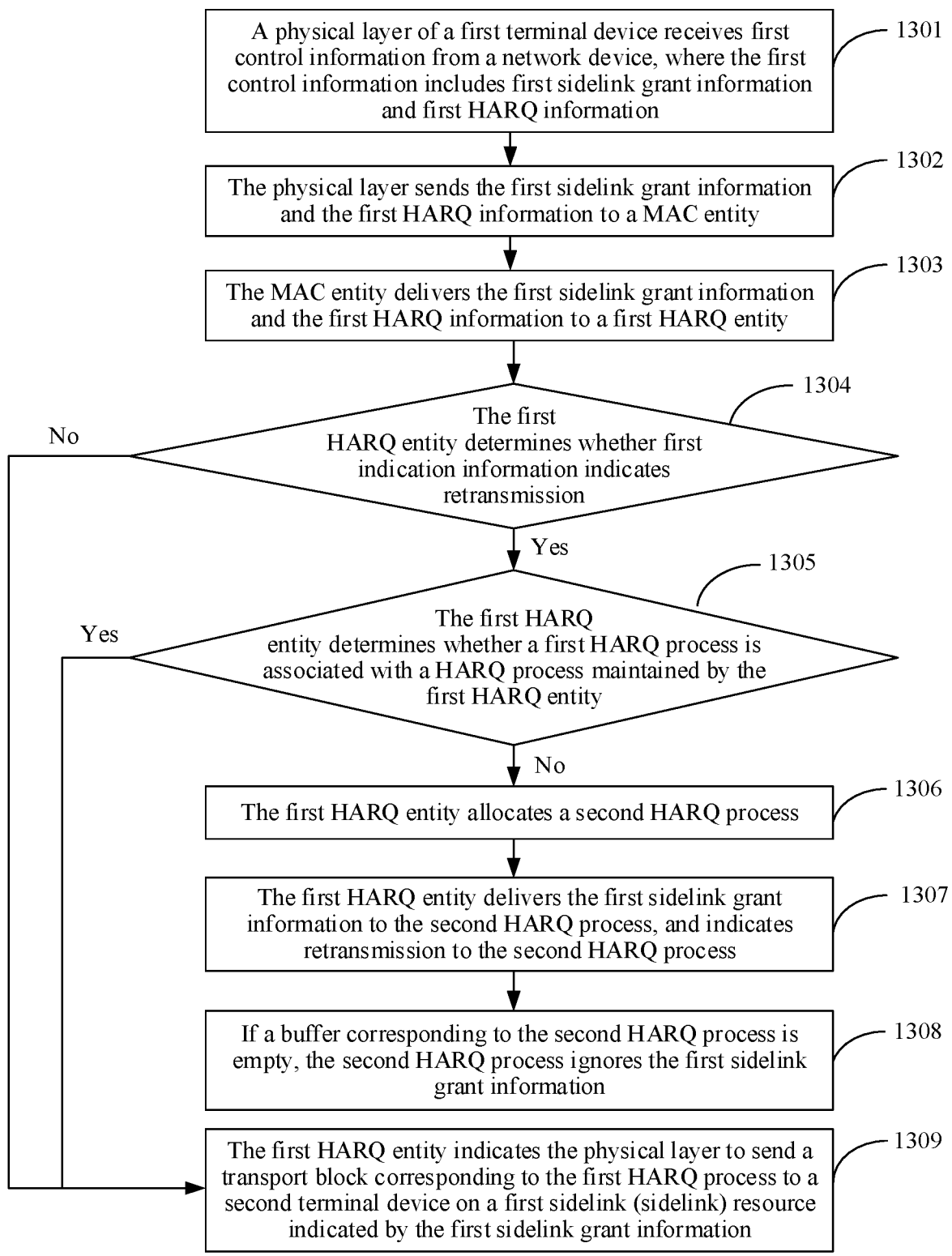
FIG. 13 is a schematic flowchart of another hybrid automatic repeat request processing method according to an embodiment of this application.

In some other embodiments, in the first terminal device, the first HARQ entity may determine whether the first indication information indicates retransmission, but the HARQ process maintained by the first HARQ entity determines whether the first terminal device has successfully sent the transport block corresponding to the first HARQ process to the second terminal device, ignores the first sidelink grant information, and indicates the physical layer to generate the second indication information. In this case, an embodiment of this application further provides a hybrid automatic repeat request processing method. For example, as shown in FIG. 13, the method may include the following steps.

Step 1301: A physical layer of a first terminal device receives first control information from a network device. The first control information includes first sidelink grant information and first HARQ information. The first sidelink grant information indicates a first sidelink resource, and the first HARQ information includes a first HARQ process ID and first indication information. The first HARQ process ID is used to indicate a first HARQ process.

Step 1302: The physical layer sends the first sidelink grant information and the first HARQ information to a MAC entity.

Step 1303: The MAC entity delivers the first sidelink grant information and the first HARQ information to a first HARQ entity. The first HARQ entity is a HARQ entity that is in the first terminal device and that is used for sidelink communication. It should be noted that, when there are a plurality of HARQ entities used for sidelink communication in the first terminal device, the first HARQ entity may be a HARQ entity corresponding to a carrier on which the first sidelink resource indicated by the first sidelink grant information is located.

Step 1304: The first HARQ entity determines, based on the first HARQ process ID and the first indication information, whether the first indication information indicates retransmission, and if yes, performs step 1305, or otherwise, performs step 1309.

Step 1305: The first HARQ entity determines whether the first HARQ process is associated with a HARQ process maintained by the first HARQ entity, and if no, performs step 1306, or if yes, performs step 1309.

Step 1306: The first HARQ entity allocates a second HARQ process. The second HARQ process is an available HARQ process, an idle HARQ process, or an unoccupied HARQ process in at least one HARQ process maintained by the first HARQ entity.

Step 1307: The first HARQ entity delivers the first sidelink grant information to the second HARQ process. Further, the first HARQ entity further indicates retransmission to the second HARQ process.

Step 1308: If the second HARQ process determines that a buffer corresponding to the second HARQ process is empty, the second HARQ process ignores the first sidelink grant information.

Further, when the first HARQ entity indicates retransmission to the second HARQ process and the buffer corresponding to the second HARQ process is empty, the second HARQ process indicates the physical layer to generate second indication information. The physical layer generates the second indication information, and sends the second indication information to the network device. The second indication information is used to indicate that the transport block corresponding to the first HARQ process has been successfully sent.

Step 1309: The first HARQ entity indicates the physical layer to send a transport block corresponding to the first HARQ process to a second terminal device on the first sidelink resource indicated by the first sidelink grant information.

Figure 14:
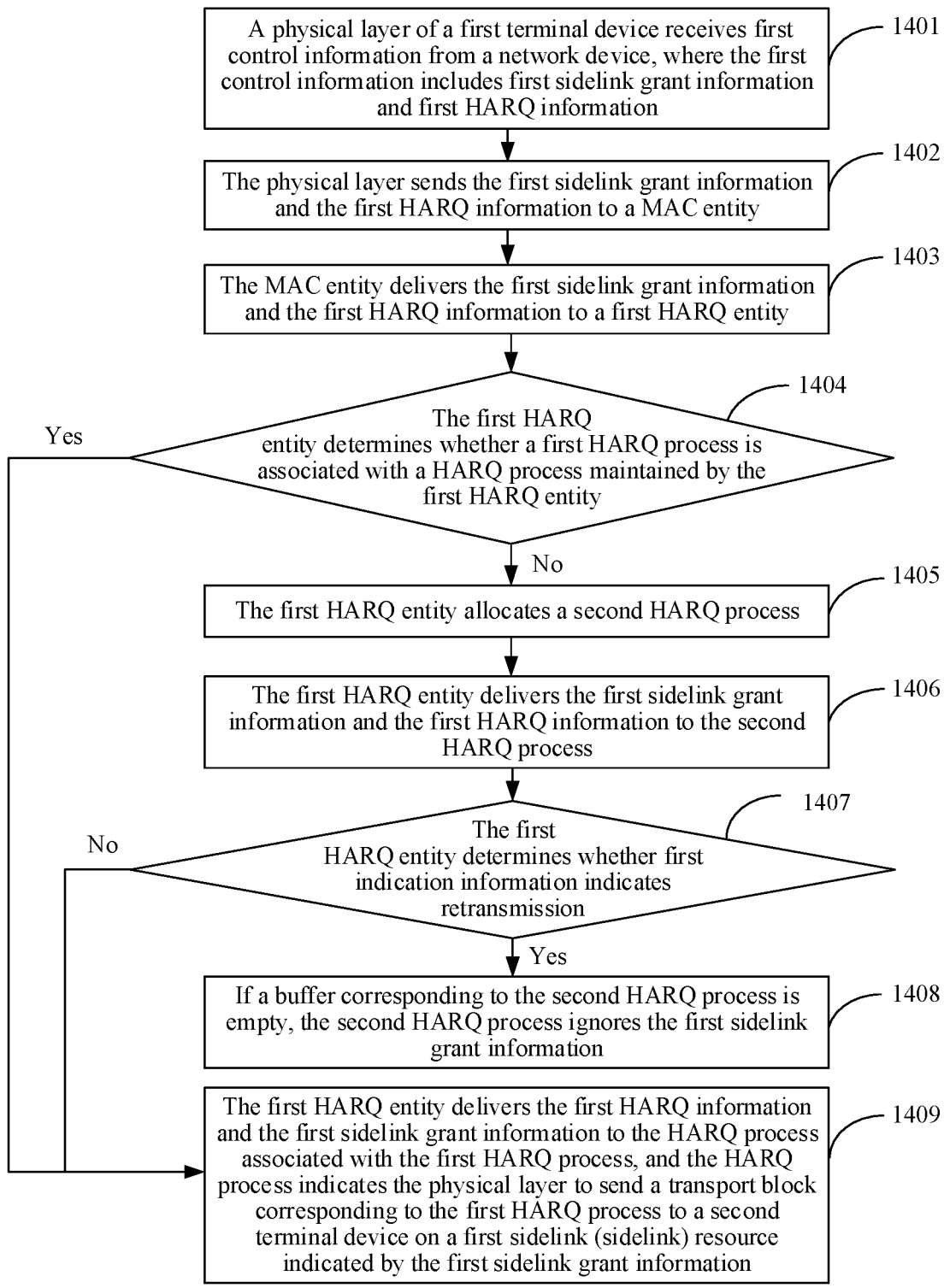
FIG. 14 is a schematic flowchart of another hybrid automatic repeat request processing method according to an embodiment of this application.

In some other embodiments, in the first terminal device, the HARQ process maintained by the first HARQ entity may determine whether the first indication information indicates retransmission, determine whether the first terminal device has successfully sent the transport block corresponding to the first HARQ process to the second terminal device, ignore the first sidelink grant information, and indicate the physical layer to generate the second indication information. In this case, an embodiment of this application further provides a hybrid automatic repeat request processing method. For example, the method is shown in FIG. 14. Different from the hybrid automatic repeat request processing method shown in FIG. 13, after the MAC entity delivers the first sidelink grant information and the first HARQ information to the first HARQ entity, the following steps are performed.

Step 1404: The first HARQ entity determines whether the first HARQ process is associated with a HARQ process maintained by the first HARQ entity, and if no, performs step 1405, or if yes, performs step 1409.

Step 1405: The first HARQ entity allocates a second HARQ process. The second HARQ process is an available HARQ process, an idle HARQ process, or an unoccupied HARQ process in at least one HARQ process maintained by the first HARQ entity.

Step 1406: The first HARQ entity delivers the first sidelink grant information and the first HARQ information to the second HARQ process.

Step 1407: The second HARQ process determines, based on the first HARQ process ID and the first indication information, whether the first indication information indicates retransmission, and if yes, performs step 1408, or otherwise, performs step 1409.

Step 1408: If a buffer corresponding to the second HARQ process is empty, the second HARQ process ignores the first sidelink grant information.

Further, the second HARQ process determines that the buffer corresponding to the second HARQ process is empty, and further indicates the physical layer to generate second indication information. The physical layer generates the second indication information, and sends the second indication information to the network device. The second indication information is used to indicate that the transport block corresponding to the first HARQ process has been successfully sent.

Step 1409: The first HARQ entity delivers the first HARQ information and the first sidelink grant information to a HARQ process that is in the at least one HARQ process maintained by the first HARQ entity and that is associated with the first HARQ process, and the HARQ process indicates the physical layer to send a transport block corresponding to the first HARQ process to a second terminal device on the first sidelink resource indicated by the first sidelink grant information.

It should be noted that, when the second HARQ process determines that the first indication information does not indicate retransmission, the HARQ process that is in the at least one HARQ process maintained by the first HARQ entity in step 1409 and that is associated with the first HARQ process is the second HARQ process allocated by the first HARQ entity in step 1405.

Figure 15:
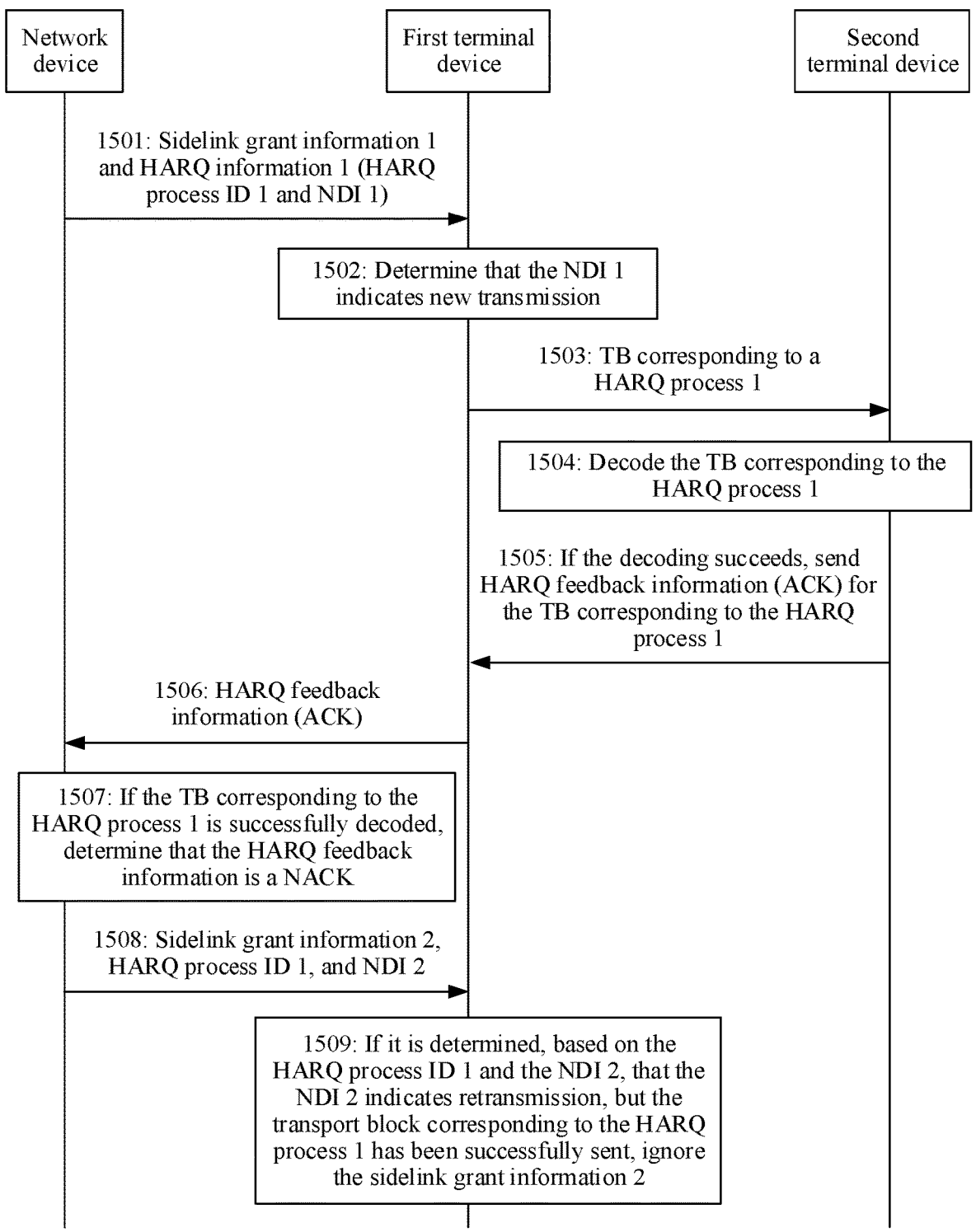
FIG. 15 is a schematic flowchart of another hybrid automatic repeat request processing method according to an embodiment of this application.

A hybrid automatic repeat request processing method according to an embodiment of this application is described with reference to sidelink communication. For example, as shown in FIG. 15, the method may include the following steps.

Step 1501: A network device sends control information 1 to a first terminal device. The control information 1 includes sidelink grant information 1 and HARQ information 1. The sidelink grant information 1 indicates a sidelink resource 1, and the HARQ information 1 includes a HARQ process ID 1 and an NDI 1. The HARQ process ID 1 is used to indicate a HARQ process 1, and the NDI 1 is equal to 0.

Step 1502: The first terminal device receives the control information 1, and determines, based on the HARQ process ID 1 and the NDI 1, that the NDI 1 indicates new transmission.

Step 1503: The first terminal device sends a transport block (TB) corresponding to the HARQ process 1 to a second terminal device on the sidelink resource 1.

Step 1504: After receiving the transport block corresponding to the HARQ process 1, the second terminal device decodes the transport block corresponding to the HARQ process 1.

Step 1505: If the transport block corresponding to the HARQ process 1 is successfully decoded, the second terminal device sends HARQ feedback information for the transport block corresponding to the HARQ process 1 to the first terminal device. The HARQ feedback information for the transport block corresponding to the HARQ process 1 is an ACK.

Step 1506: The first terminal device receives the HARQ feedback information: the ACK for the transport block corresponding to the HARQ process 1, determines that the transport block corresponding to the HARQ process 1 has been successfully sent, and sends the HARQ feedback information for the transport block corresponding to the HARQ process 1 to the network device.

Step 1507: The network device receives the HARQ feedback information for the transport block corresponding to the HARQ process 1, and determines that the HARQ feedback information for the transport block corresponding to the HARQ process 1 is a NACK.

Step 1508: The network device sends control information 2 to the first terminal device. The control information 2 includes sidelink grant information 2 and HARQ information 2. The sidelink grant information 2 indicates a sidelink resource 2, and the HARQ information 2 includes the HARQ process ID 1 and an NDI 2. The HARQ process ID 1 is used to indicate the HARQ process 1, and the NDI 2 is equal to 0.

Step 1509: If the first terminal device receives the control information 2, and determines, based on the HARQ process ID 1 and the NDI 2, that the NDI 2 indicates retransmission, but the transport block corresponding to the HARQ process 1 has been successfully sent, the first terminal device ignores the sidelink grant information 2.

It should be noted that the foregoing is described by using an example in which the first terminal device successfully sends the transport block corresponding to the first HARQ process to the second terminal device in a case of new transmission. This embodiment of this application is further applicable to a scenario in which new transmission fails but retransmission succeeds. This is not limited.

Figure 16:
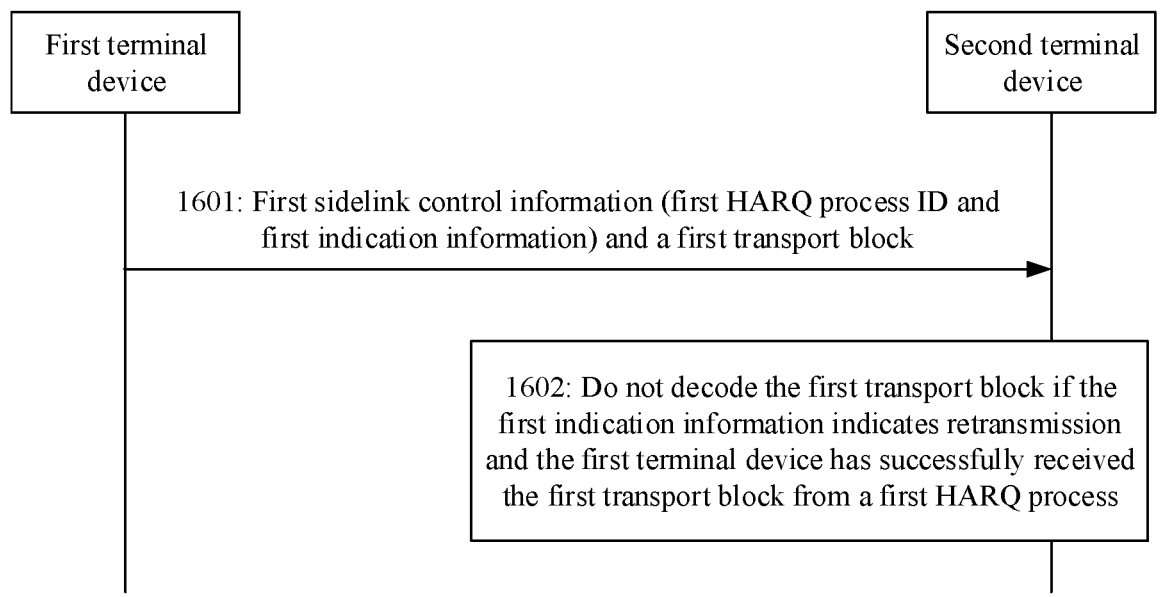
FIG. 16 is a schematic flowchart of another hybrid automatic repeat request processing method according to an embodiment of this application.

To avoid an exception occurring after a receive terminal receives, when determining that a first TB is successfully decoded, the first TB retransmitted by a transmit terminal, an embodiment of this application provides a hybrid automatic repeat request processing method. For example, as shown in FIG. 16, the method may include the following steps.

Step 1601: A second terminal device sends first sidelink information to a first terminal device by using a first HARQ process. The first sidelink information includes first sidelink control information and a first transport block. The first sidelink control information includes first HARQ information. The first HARQ information includes a first HARQ process ID and first indication information. The first HARQ process ID is used to indicate the first HARQ process.

For example, for a related description of the first indication information, refer to the related description of the first indication information in FIG. 10.

In this embodiment of this application, the first sidelink control information may further include first sidelink grant information. The first sidelink grant information indicates a sidelink resource used for sidelink communication.

Step 1602: The first terminal device receives the first sidelink information sent by the second terminal device, and does not decode the first transport block if the first indication information indicates retransmission and the first terminal device has successfully received the first transport block from the first HARQ process.

In this embodiment of this application, when the first terminal device has successfully received the first transport block from the first HARQ process, if the first terminal device receives the first transport block retransmitted by the second terminal device, the first terminal device does not decode the retransmitted first transport block, thereby helping avoid an exception of the first terminal device, and improving communication performance of the first terminal device.

For example, after receiving the first sidelink information, the first terminal device may first determine whether the first indication information indicates retransmission, and if the first indication information indicates retransmission, determine whether the first terminal device has successfully received the first transport block from the first HARQ process. If the first terminal device has successfully received the first transport block from the first HARQ process, the first terminal device does not decode the retransmitted first transport block.

The following correspondingly describes a manner of determining whether the first terminal device has successfully received the first transport block from the first HARQ process.

Manner A: The first terminal device determines, based on a parameter value of a first parameter associated with the first HARQ process, whether the first terminal device has successfully received the first transport block from the first HARQ process.

For a specific implementation, refer to the related description of determining whether the first terminal device has successfully sent the transport block corresponding to the first HARQ process to the second terminal device in Manner 1.

Manner B: The first terminal device determines whether the first HARQ process is associated with a HARQ process maintained by a first HARQ entity, to determine whether the first terminal device has successfully received the first transport block from the first HARQ process.

For a specific implementation, refer to the related description of determining whether the first terminal device has successfully sent the transport block corresponding to the first HARQ process to the second terminal device in Manner 2.

Manner C: The first terminal device determines whether the first HARQ process is associated with a HARQ process maintained by a first HARQ entity. If the first HARQ process is not associated with the HARQ process maintained by the first HARQ entity, the first terminal device allocates a second HARQ process. Then, the first terminal device determines whether a buffer corresponding to the second HARQ process is empty. If the buffer corresponding to the second HARQ process is empty, the first terminal device determines that the first terminal device has successfully received the first transport block from the first HARQ process.

It may be understood that the second HARQ process is an available HARQ process, an idle HARQ process, or an unoccupied HARQ process in at least one HARQ process that is in the first terminal device and that is used for sidelink communication.

For example, the first terminal device uses the first HARQ entity to determine whether the first HARQ process is associated with the HARQ process maintained by the first HARQ entity. If the first HARQ process is not associated with the HARQ process maintained by the first HARQ entity, the first HARQ entity allocates the second HARQ process, and delivers the first transport block to the second HARQ process. Then, the second HARQ process determines whether the buffer corresponding to the second HARQ process is empty. If the buffer corresponding to the second HARQ process is empty, the second HARQ process determines that the first terminal device has successfully received the first transport block, and does not decode the first transport block.

It should be noted that the foregoing three manners of determining whether the first terminal device has successfully received the first transport block from the first HARQ process are merely examples for description, and constitute no limitation in the embodiments of this application.

Further, in some embodiments, if the first indication information indicates retransmission and the first terminal device has successfully received the first transport block from the first HARQ process, the first terminal device sends second indication information to the network device. The second indication information is used to indicate that the first transport block has been successfully received. Therefore, after receiving the second indication information, the network device does not decode the retransmitted first transport block, so as to help avoid a resource waste.

The embodiment of this application in FIG. 16 is described in detail by using the software structure of the terminal device shown in FIG. 9 as an example.

Figure 17:
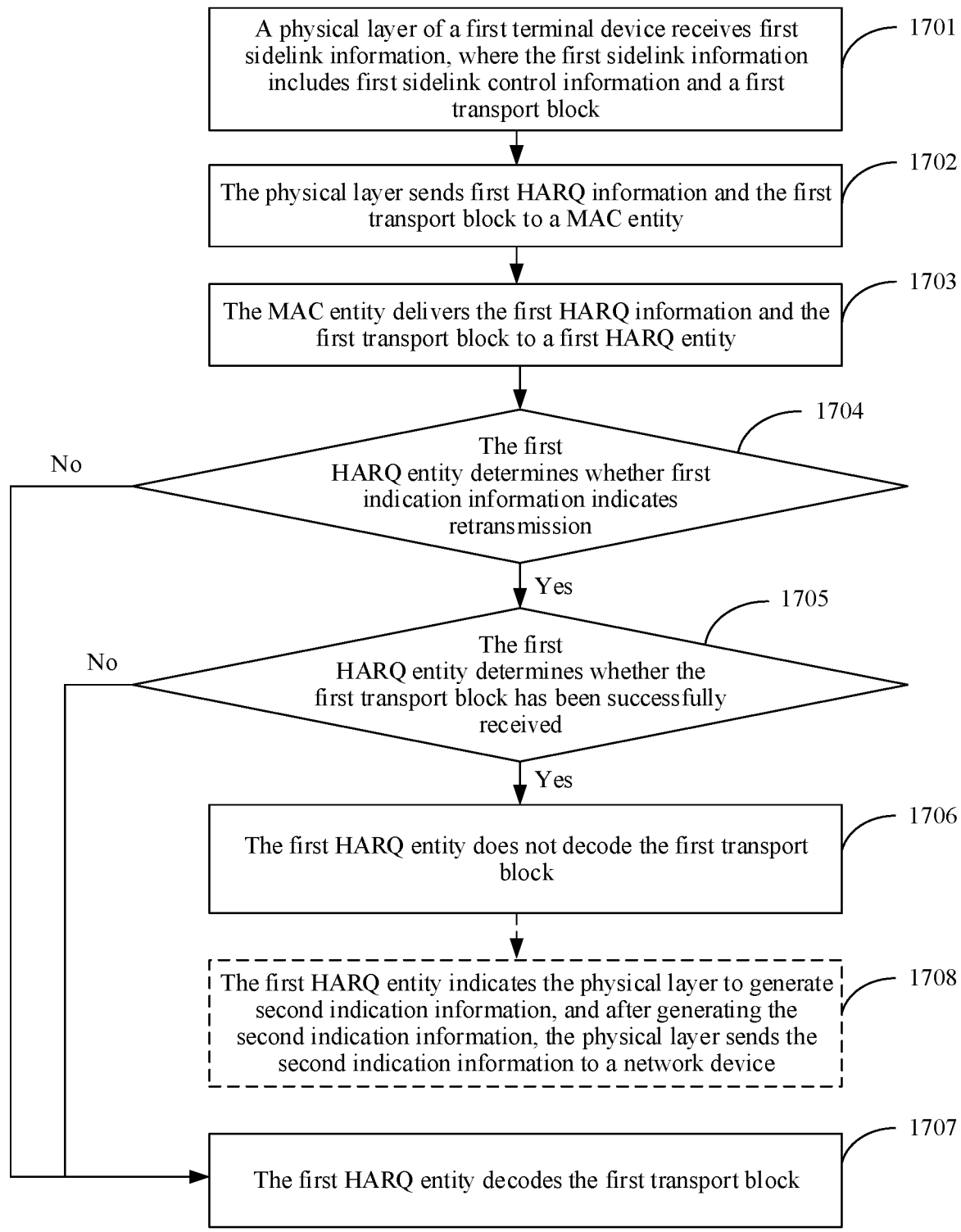
FIG. 17 is a schematic flowchart of another hybrid automatic repeat request processing method according to an embodiment of this application.

For example, FIG. 17 shows a hybrid automatic repeat request processing method according to an embodiment of this application. The method may include the following steps.

Step 1701: A physical layer of a first terminal device receives first sidelink information of a first HARQ process from a second terminal device. The first sidelink information includes first sidelink control information and a first transport block. The first sidelink control information includes first HARQ information, and the first HARQ information includes a first HARQ process ID and first indication information. The first HARQ process ID is used to indicate a first HARQ process.

Step 1702: The physical layer sends the first HARQ information and the first transport block to a MAC entity.

Step 1703: The MAC entity delivers the first HARQ information and the first transport block to a first HARQ entity. The first HARQ entity is a HARQ entity that is in the first terminal device and that is used for sidelink communication.

Further, the first sidelink control information may further include first sidelink grant information. The first sidelink grant information is used to indicate a first sidelink resource. In this case, the physical layer further sends the first sidelink grant information to the MAC entity, and the MAC entity delivers the first sidelink grant information to the first HARQ entity.

Step 1704: The first HARQ entity determines, based on the first HARQ process ID and the first indication information, whether the first indication information indicates retransmission, and if yes, performs step 1705, or otherwise, performs step 1707.

Step 1705: The first HARQ entity determines whether the first terminal device has successfully received the first transport block, and if yes, performs step 1706, or otherwise, performs step 1707.

For example, the first HARQ entity determines, based on a parameter value of a first parameter associated with the first HARQ process, whether the first terminal device has successfully received the first transport block. For a specific implementation, refer to the related description in Manner A. For another example, the first HARQ entity determines whether the first HARQ process is associated with a HARQ process maintained by the first HARQ entity, to determine whether the first terminal device has successfully received the first transport block. For a specific implementation, refer to the related description in Manner B.

Step 1706: The first HARQ entity does not decode the first transport block.

Step 1707: The first HARQ entity decodes the first transport block.

In some embodiments, when the first HARQ entity determines that the first terminal device has successfully received the first transport block in step 1705, the method further includes step 1708.

Step 1708: The first HARQ entity indicates the physical layer to generate second indication information, and after generating the second indication information, the physical layer sends the second indication information to a network device. The second indication information is used to indicate that the first transport block has been successfully received.

It should be noted that step 1706 and step 1708 are not subject to a specific sequence. The first HARQ entity may perform step 1706 before step 1708, or may perform step 1708 before step 1706, or may perform step 1706 and step 1708 at the same time.

It should be noted that, in the hybrid automatic repeat request processing method shown in FIG. 17, the first HARQ entity determines whether the first indication information indicates retransmission, determines whether the first terminal device has successfully received the first transport block, does not decode the first transport block, and indicates the physical layer to generate the second indication information.

Figure 18:
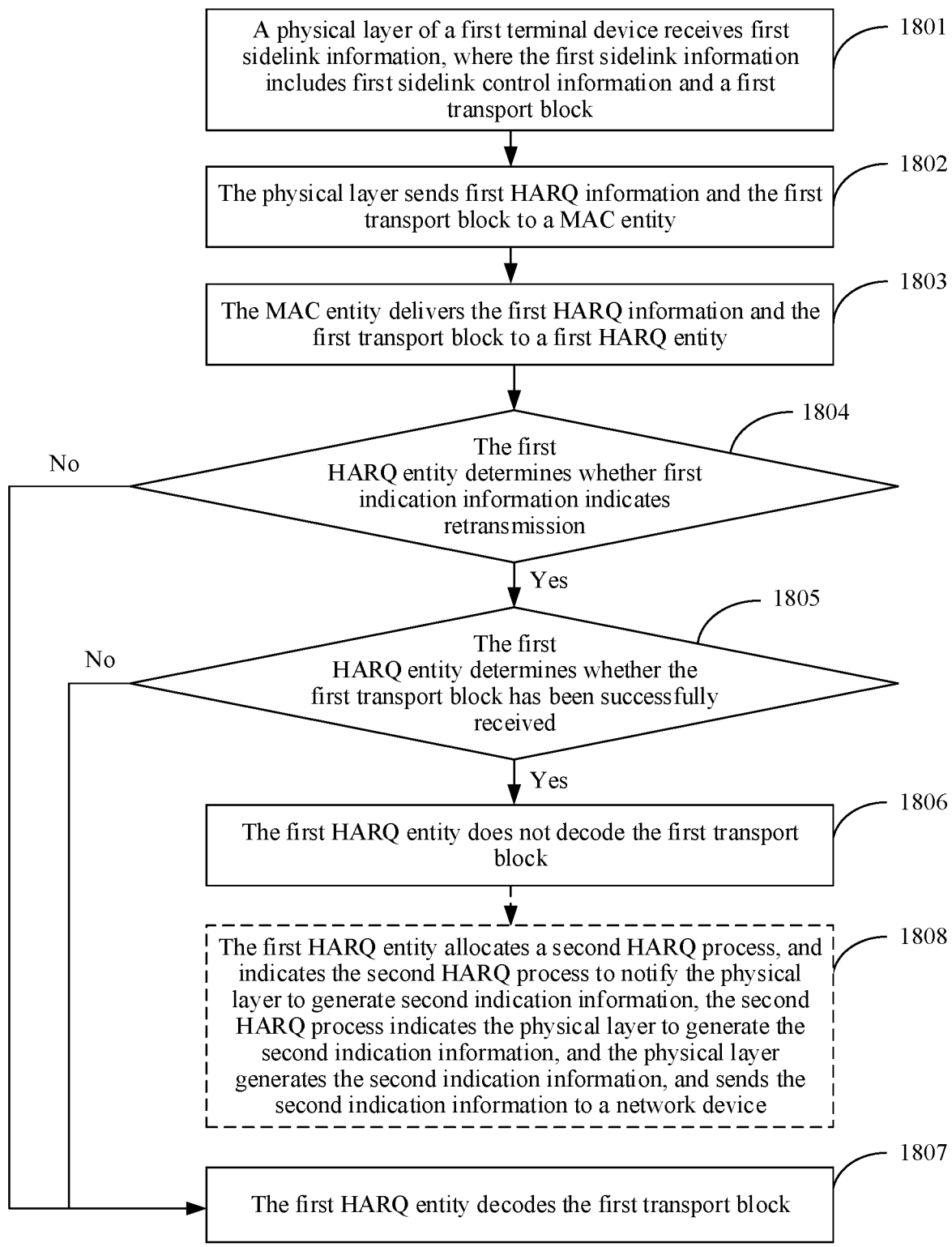
FIG. 18 is a schematic flowchart of another hybrid automatic repeat request processing method according to an embodiment of this application.

In some other embodiments, in the first terminal device, the first HARQ entity determines whether the first indication information indicates retransmission, determines whether the first terminal device has successfully received the first transport block, and does not decode the first transport block, but the HARQ process maintained by the first HARQ entity indicates the physical layer to generate the second indication information. In this case, an embodiment of this application further provides a hybrid automatic repeat request processing method. For example, the method is shown in FIG. 18. Different from FIG. 17, when the first HARQ entity determines that the first terminal device has successfully received the first transport block, the method further includes step 1808.

Step 1808: The first HARQ entity allocates a second HARQ process. The second HARQ process is an available HARQ process, an idle HARQ process, or an unoccupied HARQ process in at least one HARQ process maintained by the first HARQ entity. Then, the first HARQ entity indicates the second HARQ process to notify the physical layer to generate second indication information. The second HARQ process indicates the physical layer to generate the second indication information. The physical layer generates the second indication information, and sends the second indication information to the network device. The second indication information is used to indicate that the first transport block has been successfully received.

It should be noted that step 1806 and step 1808 are not subject to a specific sequence. The first HARQ entity may perform step 1806 before step 1808, or may perform step 1808 before step 1806, or may perform step 1806 and step 1808 at the same time.

Figure 19:
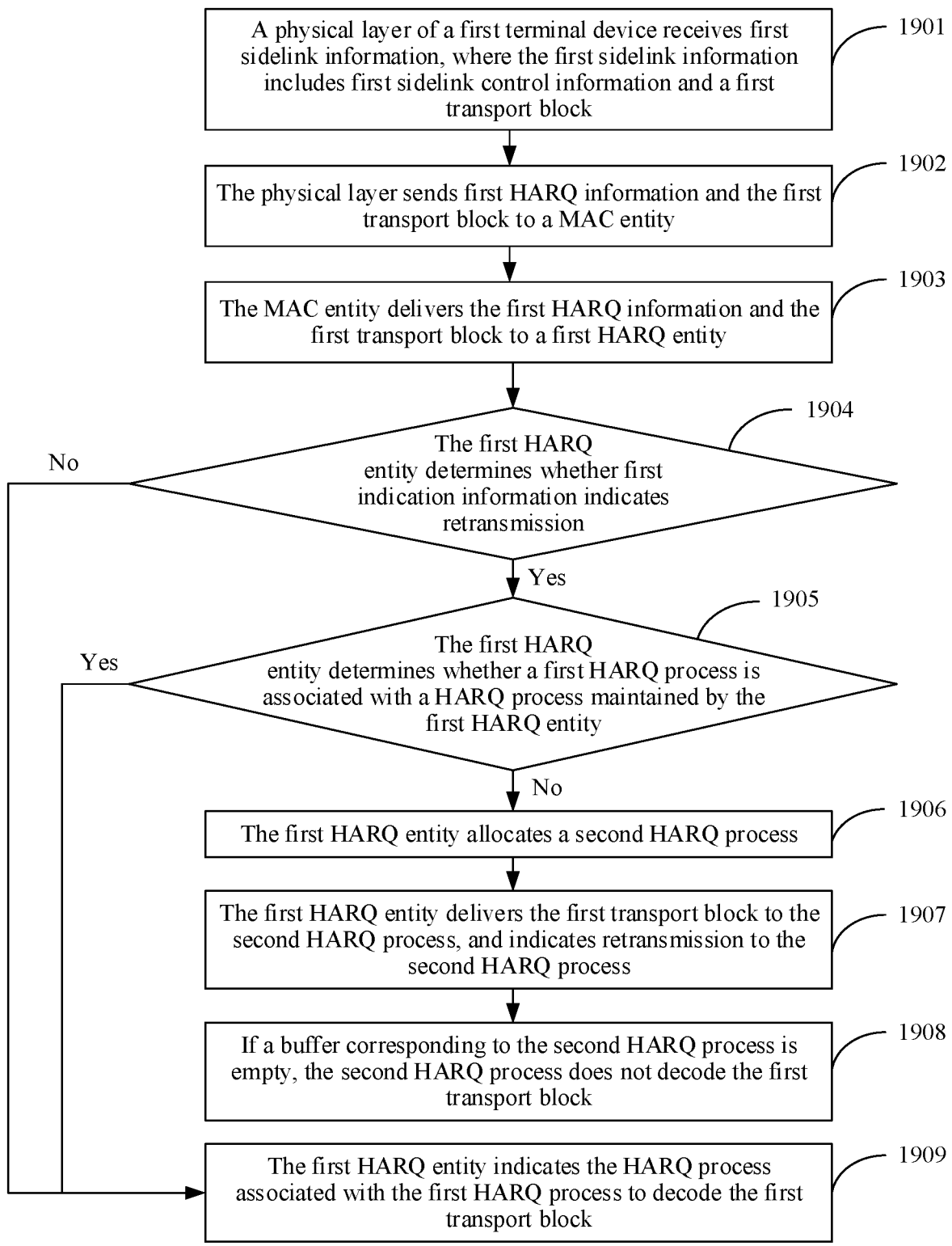
FIG. 19 is a schematic flowchart of another hybrid automatic repeat request processing method according to an embodiment of this application.

In some other embodiments, in the first terminal device, the first HARQ entity may determine whether the first indication information indicates retransmission, but the HARQ process maintained by the first HARQ entity determines whether the first terminal device has successfully received the first transport block, does not decode the first transport block, and indicates the physical layer to generate the second indication information. In this case, an embodiment of this application further provides a hybrid automatic repeat request processing method. For example, as shown in FIG. 19, the method may include the following steps.

Step 1901: A physical layer of a first terminal device receives first sidelink information of a first HARQ process from a second terminal device. The first sidelink information includes first sidelink control information and a first transport block. The first sidelink grant information indicates a first sidelink resource, and the first HARQ information includes a first HARQ process ID and first indication information. The first HARQ process ID is used to indicate a first HARQ process.

Step 1902: The physical layer sends the first HARQ information and the first transport block to a MAC entity.

Step 1903: The MAC entity delivers the first HARQ information and the first transport block to a first HARQ entity. The first HARQ entity is a HARQ entity that is in the first terminal device and that is used for sidelink communication.

Further, the first sidelink control information may further include first sidelink grant information. The first sidelink grant information is used to indicate a first sidelink resource. In this case, the physical layer further sends the first sidelink grant information to the MAC entity, and the MAC entity delivers the first sidelink grant information to the first HARQ entity.

Step 1904: The first HARQ entity determines, based on the first HARQ process ID and the first indication information, whether the first indication information indicates retransmission, and if yes, performs step 1905, or otherwise, performs step 1909.

Step 1905: The first HARQ entity determines whether the first HARQ process is associated with a HARQ process maintained by the first HARQ entity, and if no, performs step 1906, or if yes, performs step 1909.

Step 1906: The first HARQ entity allocates a second HARQ process. The second HARQ process is an available HARQ process, an idle HARQ process, or an unoccupied HARQ process in at least one HARQ process maintained by the first HARQ entity.

Step 1907: The first HARQ entity delivers the first transport block to the second HARQ process. Further, the first HARQ entity further indicates retransmission to the second HARQ process.

Step 1908: If the second HARQ process determines that a buffer corresponding to the second HARQ process is empty, the second HARQ process does not decode the first transport block.

Further, if the second HARQ process determines that the buffer corresponding to the second HARQ process is empty, the second HARQ process further indicates the physical layer to generate second indication information. The physical layer generates the second indication information, and sends the second indication information to a network device. The second indication information is used to indicate that the first transport block has been successfully received.

Step 1909: The first HARQ entity indicates the HARQ process associated with the first HARQ process to decode the first transport block.

Figure 20:
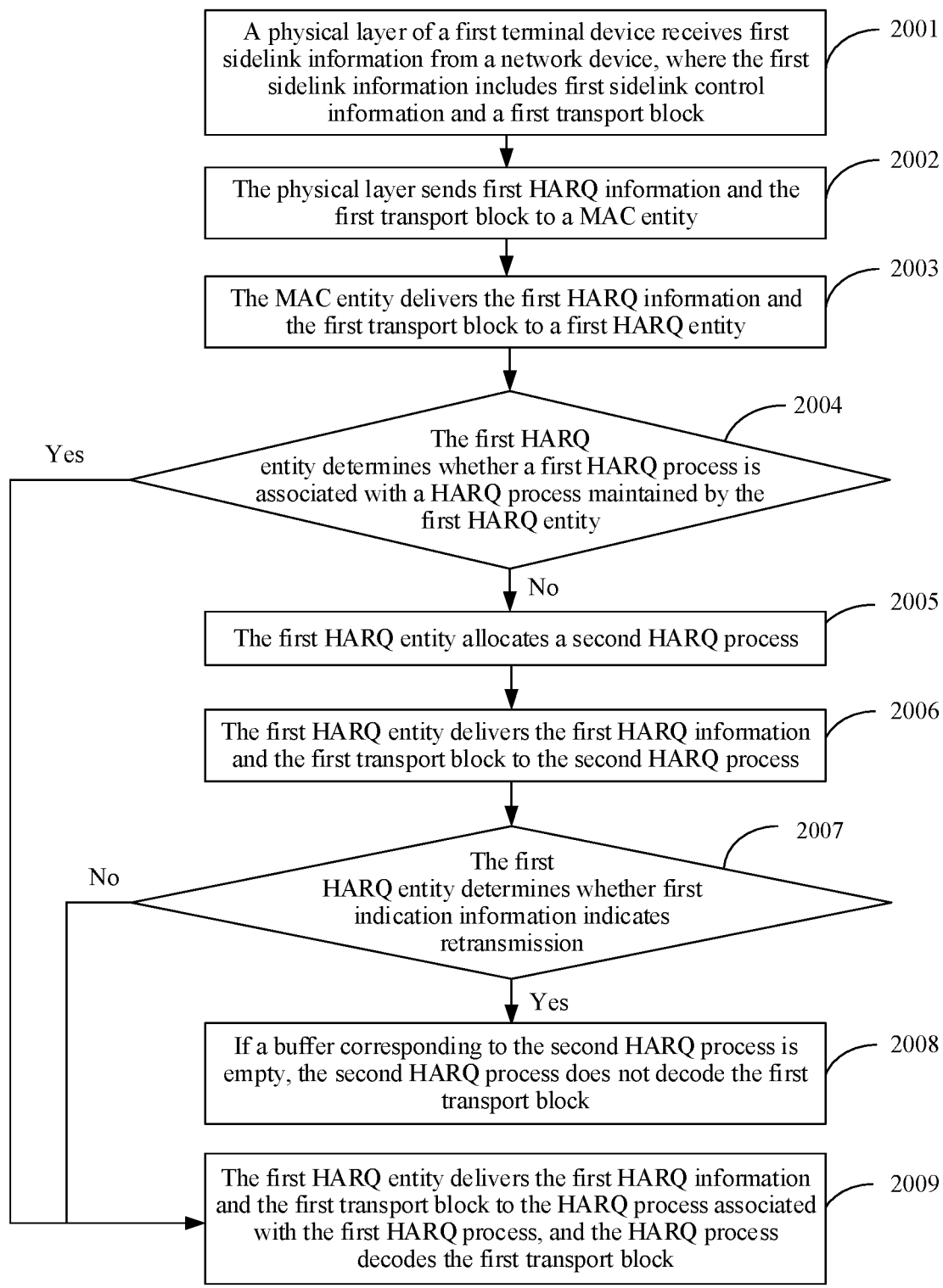
FIG. 20 is a schematic flowchart of another hybrid automatic repeat request processing method according to an embodiment of this application.

In some other embodiments, in the first terminal device, the HARQ process maintained by the first HARQ entity determines whether the first indication information indicates retransmission, determines whether the first terminal device has successfully received the first transport block, does not decode the first transport block, and indicates the physical layer to generate the second indication information. In this case, an embodiment of this application further provides a hybrid automatic repeat request processing method. For example, the method is shown in FIG. 20. Different from the hybrid automatic repeat request processing method shown in FIG. 19, after the MAC entity delivers the first HARQ information and the first transport block to the first HARQ entity, the following steps are performed.

Step 2004: The first HARQ entity determines whether the first HARQ process is associated with a HARQ process maintained by the first HARQ entity, and if no, performs step 2005, or if yes, performs step 2009.

Step 2005: The first HARQ entity allocates a second HARQ process. The second HARQ process is an available HARQ process, an idle HARQ process, or an unoccupied HARQ process in at least one HARQ process maintained by the first HARQ entity.

Step 2006: The first HARQ entity delivers the first HARQ information and the first transport block to the second HARQ process.

Step 2007: The second HARQ process determines, based on the first HARQ information, whether the first indication information indicates retransmission, and if yes, performs step 2008, or otherwise, performs step 2009.

Step 2008: If the second HARQ process determines that a buffer corresponding to the second HARQ process is empty, the second HARQ process does not decode the first transport block.

Further, the second HARQ process determines that the buffer corresponding to the second HARQ process is empty, and further indicates the physical layer to generate second indication information. The physical layer generates the second indication information, and sends the second indication information to a network device. The second indication information is used to indicate that the first transport block has been successfully received.

Step 2009: The first HARQ entity delivers the first HARQ information and the first transport block to a HARQ process that is in the at least one HARQ process maintained by the first HARQ entity and that is associated with the first HARQ process, and then the HARQ process decodes the first transport block.

It should be noted that, when the second HARQ process determines that the first indication information does not indicate retransmission, the HARQ process that is in the at least one HARQ process maintained by the first HARQ entity in step 2009 and that is associated with the first HARQ process is the second HARQ process allocated by the first HARQ entity in step 2005.

Figure 21:
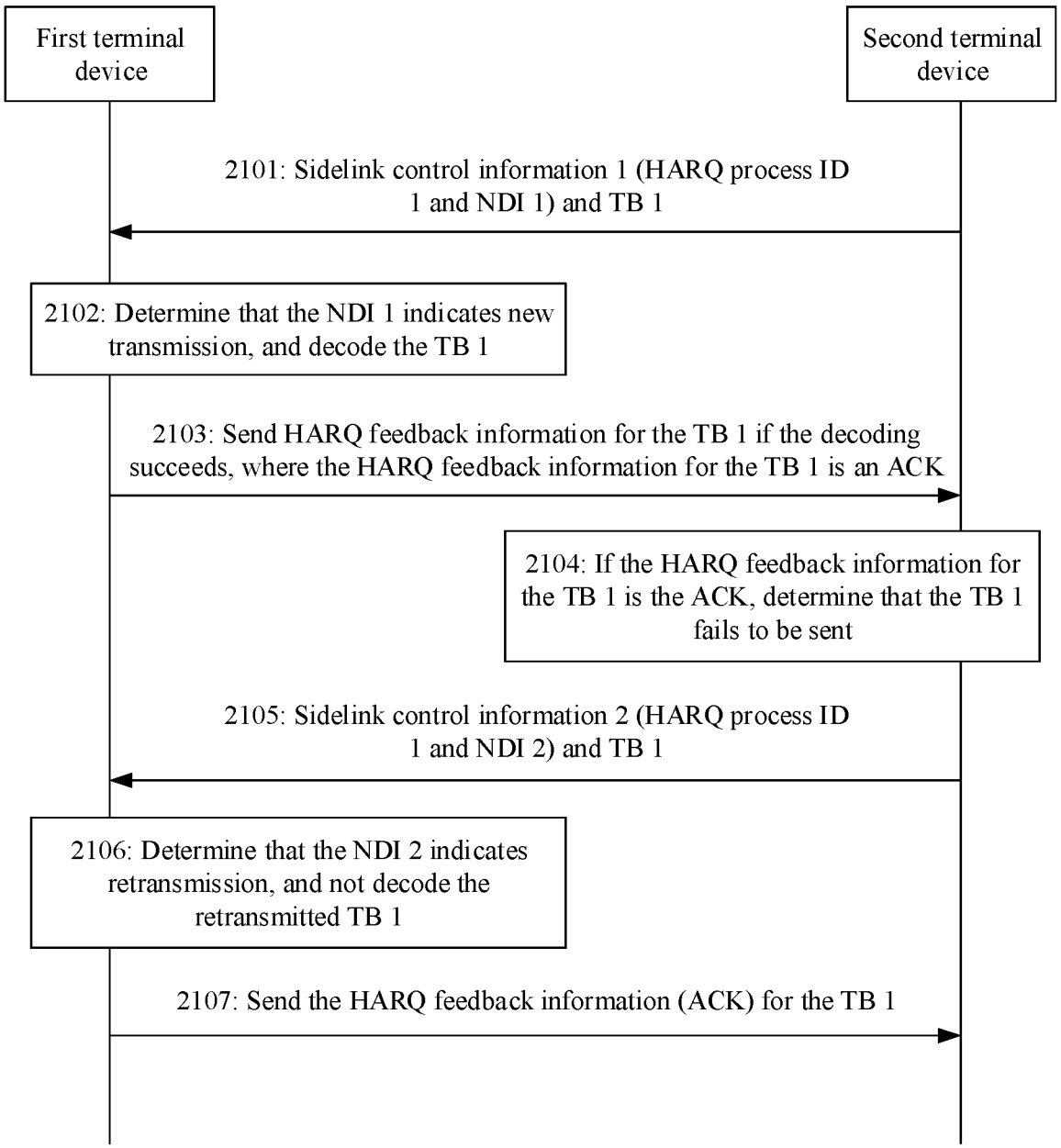
FIG. 21 is a schematic flowchart of another hybrid automatic repeat request processing method according to an embodiment of this application.

A hybrid automatic repeat request processing method according to an embodiment of this application is described with reference to sidelink communication. For example, as shown in FIG. 21, the method may include the following steps.

Step 2101: A second terminal device sends sidelink information 1 to a first terminal device by using a HARQ process 1. The sidelink information 1 includes sidelink control information 1 and a transport block 1. The sidelink control information 1 includes HARQ information 1, and the HARQ information 1 includes a HARQ process ID 1 and an NDI 1. The HARQ process ID 1 is used to indicate the HARQ process 1, and the NDI 1 is equal to 0.

Step 2102: The first terminal device receives the sidelink information 1, and determines, based on the HARQ process ID 1 and the NDI 1, that the NDI 1 indicates new transmission, and decodes the transport block 1.

Step 2103: After successfully decoding the transport block 1, the first terminal device sends HARQ feedback information for the transport block 1 to the second terminal device. The HARQ feedback information for the transport block 1 is an ACK.

Step 2104: The second terminal device receives the HARQ feedback information for the transport block 1, but determines that the transport block fails to be sent.

Step 2105: The second terminal device sends sidelink information 2 to the first terminal device by using the HARQ process 1. The sidelink information 2 includes sidelink control information 2 and the transport block 1. The sidelink control information 2 includes the HARQ information 1, and the HARQ information 1 includes the HARQ process ID 1 and an NDI 2. The HARQ process ID 1 is used to indicate the HARQ process 1, and the NDI 2 is equal to 0.

Step 2106: If the first terminal device receives the sidelink information 2, and determines, based on the HARQ process ID 1 and the NDI 2, that the NDI 2 indicates retransmission, the first terminal device does not decode the retransmitted transport block 1. Further, the first terminal device determines that the NDI 2 indicates retransmission, and further feeds back the HARQ feedback information for the transport block 1 to the second terminal device. The HARQ feedback information for the transport block 1 that is fed back to the second terminal device is an ACK.

Further, the method further includes step 2107: The first terminal device sends the HARQ feedback information for the TB 1 to the second terminal device. The HARQ feedback information for the TB 1 is an ACK.

It should be noted that the foregoing is described by using an example in which the first terminal device receives, when new transmission succeeds, the transport block 1 retransmitted by the second terminal device. This embodiment of this application is further applicable to a scenario in which new transmission fails but retransmission succeeds. This is not limited.

The foregoing embodiments may be used separately, or may be used in combination with each other. This is not limited.

The foregoing mainly describes the solutions provided in the embodiments of this application from a perspective of interaction between network elements. It may be understood that, to implement the foregoing functions, each of network elements such as the terminal and the network device includes a corresponding hardware structure and/or software module for performing each function. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, function modules of the terminal and the network device may be obtained through division based on the foregoing method examples. For example, each function module may be obtained through division based on each corresponding function, or two or more functions may be integrated into one processing module. The foregoing integrated module may be implemented in a form of hardware, or may be implemented in a form of a software function module. It should be noted that, in the embodiments of this application, division into the modules is an example, and is merely logical function division. In actual implementation, another division manner may be used. An example in which each function module is obtained through division based on each corresponding function is used below for description.

Figure 22:
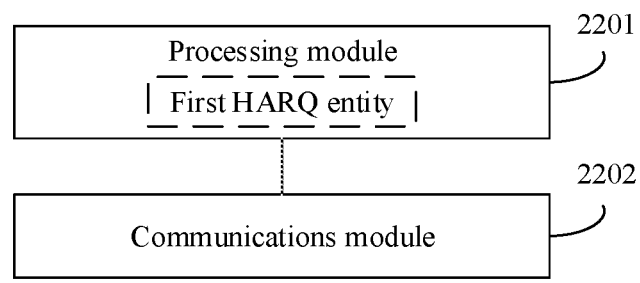
FIG. 22 is a schematic structural diagram of a terminal device according to an embodiment of this application.

FIG. 22 is a schematic structural diagram of a communications apparatus according to an embodiment of this application. As shown in FIG. 22, the communications apparatus includes a processing module 2201 and a communications module 2202.

Optionally, the communications apparatus may perform at least one of the following solutions:

Solution 1:

The communications module 2202 is configured to receive first control information sent by a network device. The first control information includes first sidelink grant information and first HARQ information. The first sidelink grant information indicates a resource used for sidelink communication. The first HARQ information includes a first HARQ process identifier (ID) and first indication information. The first HARQ process ID is used to indicate a first HARQ process. The processing module 2201 is configured to ignore the first sidelink grant information if the first indication information indicates retransmission and the communications module 2202 has successfully sent a transport block corresponding to the first HARQ process to a second terminal device.

In an example embodiment, the communications module 2202 is further configured to send second indication information to the network device. The second indication information is used to indicate that the transport block corresponding to the first HARQ process has been successfully sent.

Further, in an example embodiment, the processing module 2201 further includes a first HARQ entity. The first HARQ entity is used for sidelink communication. The first HARQ entity is configured to indicate the communications module 2202 to generate the second indication information at a physical layer. The communications module 2202 is configured to generate the second indication information at the physical layer.

In an example embodiment, the processing module 2201 further includes a first HARQ entity. The first HARQ entity is used for sidelink communication. A HARQ process maintained by the first HARQ entity includes a second HARQ process.

The second HARQ process is configured to indicate the communications module 2202 to generate the second indication information at a physical layer.

In an example embodiment, the processing module 2201 further includes a first HARQ entity. The first HARQ entity is used for sidelink communication. The first HARQ entity is configured to:

after the communications module 2202 receives the first control information, obtain a parameter value of a first parameter associated with the first HARQ process; if the parameter value of the first parameter associated with the first HARQ process is a first value, determine that the communications module 2202 has successfully sent the transport block corresponding to the first HARQ process to the second terminal device; and ignore the first sidelink grant information, where the first value is used to indicate that HARQ feedback information for the transport block corresponding to the first HARQ process is an ACK.

In an example embodiment, the processing module 2201 includes a first HARQ entity. The first HARQ entity is used for sidelink communication. The first HARQ entity is configured to:

after the communications module 2202 receives the first control information sent by the network device, determine whether the first HARQ process is associated with a HARQ process maintained by the first HARQ entity; if no, determine that the communications module 2202 has successfully sent the transport block corresponding to the first HARQ process to the second terminal device; and ignore the first sidelink grant information.

In an example embodiment, the processing module 2201 includes a first HARQ entity. The first HARQ entity is used for sidelink communication.

The first HARQ entity is configured to:
after the communications module 2202 receives the first control information, determine whether the first HARQ process is associated with the HARQ process maintained by the first HARQ entity; if no, allocate the second HARQ process, and deliver the first sidelink grant information to the second HARQ process.

The second HARQ process is further configured to:
if a buffer corresponding to the second HARQ process is empty, determine that the communications module 2202 has successfully sent the transport block corresponding to the first HARQ process to the second terminal device; and ignore the first sidelink grant information.

Solution 2:

The communications module 2202 is configured to receive first sidelink information sent by a first HARQ process of a second terminal device. The first sidelink information includes first sidelink control information and a first transport block.

The first sidelink control information includes first HARQ information. The first HARQ information includes a first HARQ process ID and first indication information. The first HARQ process ID is used to indicate a first HARQ process.

The processing module 2201 is configured to skip decoding the first transport block if the first indication information indicates retransmission and the communications module 2202 has successfully received the first transport block from the first HARQ process.

In an example embodiment, the communications module 2202 is further configured to send second indication information to the second terminal device. The second indication information is used to indicate that the first transport block has been successfully received.

Further, in an example embodiment, the processing module 2201 further includes a first HARQ entity. The first HARQ entity is used for sidelink communication. The first HARQ entity is configured to indicate the communications module to generate the second indication information at a physical layer. The communications module generates the second indication information at the physical layer, and sends the second indication information to a network device.

In an example embodiment, the processing module 2201 further includes a first HARQ entity. The first HARQ entity is used for sidelink communication. A HARQ process maintained by the first HARQ entity includes a second HARQ process. The second HARQ process is configured to indicate the communications module 2202 to generate the second indication information at a physical layer. The communications module 2202 generates the second indication information at the physical layer, and sends the second indication information to a network device.

In an example embodiment, the processing module 2201 further includes a first HARQ entity. The first HARQ entity is used for sidelink communication. The first HARQ entity is configured to:
after the communications module 2202 receives the first sidelink information from the first HARQ process, obtain a parameter value of a first parameter associated with the first HARQ process; if the parameter value of the first parameter associated with the first HARQ process is a first value, determine that the first transport block has been successfully received; and skip decoding the first transport block, where the first value is used to indicate that the first terminal device successfully decodes the first transport block received from the first HARQ process.

In an example embodiment, the first HARQ entity is further configured to:
if the parameter value of the first parameter associated with the first HARQ process is a second value, determine that the first transport block fails to be received, where the second value is used to indicate that the first terminal device fails to decode the first transport block received from the first HARQ process.

In an example embodiment, the processing module further includes a first HARQ entity. The first HARQ entity is used for sidelink communication. The first HARQ entity is configured to:
after the communications module 2202 receives the first sidelink information sent by the first HARQ process of the second terminal device, determine whether the first HARQ process is associated with a HARQ process maintained by the first HARQ entity; if no, determine that the first transport block has been successfully received; and skip decoding the first transport block.

In an example embodiment, the processing module 2201 further includes a first HARQ entity. The first HARQ entity is used for sidelink communication. The first HARQ entity is configured to:
after the communications module 2202 receives the first sidelink information sent by the first HARQ process of the second terminal device, determine whether the first HARQ process is associated with a HARQ process maintained by the first HARQ entity; and
if the first HARQ process is not associated with the HARQ process maintained by the first HARQ entity, allocate the second HARQ process, and deliver the first transport block to the second HARQ process.

The second HARQ process is configured to:
if a buffer corresponding to the second HARQ process is empty, determine that the first transport block has been successfully received; and skip decoding the first transport block.

An embodiment of this application further provides a computer-readable storage medium. The computer-readable storage medium stores computer instructions. When the computer-readable storage medium runs on a communications apparatus, the communications apparatus is enabled to perform the method shown in FIG. 5, FIG. 9, or FIG. 11. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium, a semiconductor medium (for example, a solid-state drive (SSD)), or the like.

An embodiment of this application further provides a computer program product including computer instructions. When the computer program product is run on a communications apparatus, the communications apparatus is enabled to perform the methods shown in FIG. 10 to FIG. 21.

An embodiment of this application further provides a communications system. The communications system includes a transmit terminal and a receive terminal. The receive terminal may perform the steps performed by the second terminal device in the method shown in FIG. 16, or the steps performed by the first terminal device in the methods shown in FIG. 17 to FIG. 21. In some other embodiments, the communications system further includes a network device. In this case, the transmit terminal may perform the steps performed by the first terminal device in FIG. 10 to FIG. 15, and/or the receive terminal may perform the steps performed by the second terminal device in the method shown in FIG. 16, or the steps performed by the first terminal device in the methods shown in FIG. 17 to FIG. 21.

Figure 23:
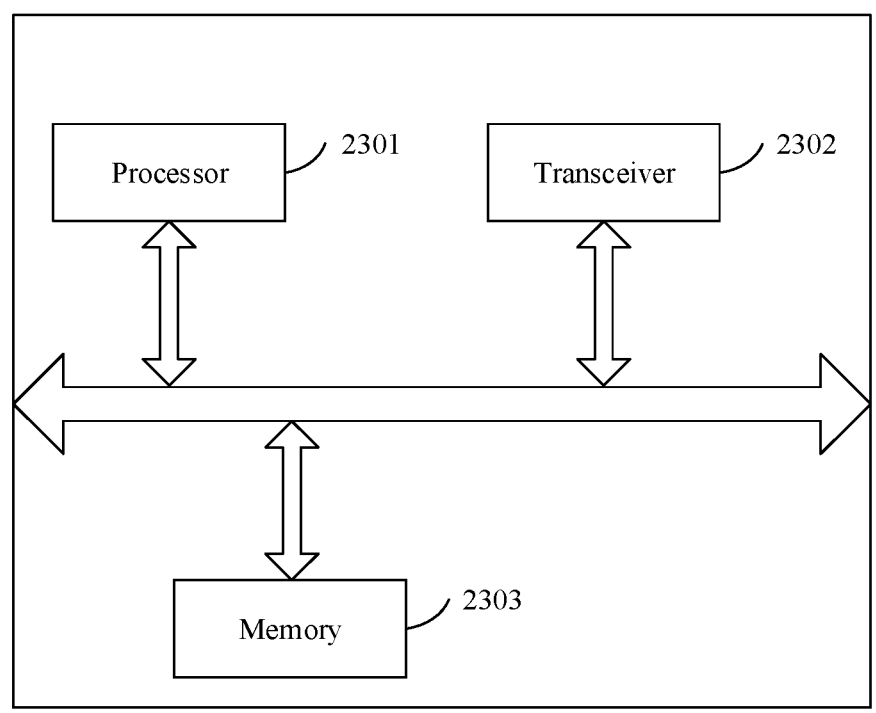
FIG. 23 is a schematic structural diagram of another terminal device according to an embodiment of this application.

FIG. 23 is a schematic structural diagram of a communications apparatus according to an embodiment of this application. The communications apparatus shown in FIG. 23 may be a chip, or may be a terminal device. The chip may be a general-purpose processor, or may be a dedicated processor. The communications apparatus includes a processor 2301. The processor 2301 is configured to support the communications apparatus in performing the methods shown in FIG. 10 to FIG. 21.

In an example, the communications apparatus further includes a transceiver 2302. The transceiver 2302 is configured to support the communications apparatus in performing the methods shown in FIG. 10 to FIG. 21 under control of the processor 2301.

In an example, the communications apparatus shown in FIG. 23 may further include a memory 2303.

It should be noted that the communications apparatus shown in FIG. 23 may be implemented by using the following circuit or component: one or more field programmable gate arrays (FPGA), a programmable logic device (PLD), a controller, a state machine, gate logic, a discrete hardware component, any other appropriate circuit, or any combination of circuits that can perform various functions described in this application.

The terminal, the network device, the computer storage medium, the computer program product, and the chip provided in the embodiments of this application are all configured to perform the methods provided above. Therefore, for beneficial effects that can be achieved by the terminal, the network device, the computer storage medium, the computer program product, and the chip, refer to the beneficial effects corresponding to the methods provided above.

With reference to the foregoing descriptions, this application further provides the following embodiments:

Embodiment 1: A hybrid automatic repeat request processing method is provided. The method includes:

A first terminal device receives first control information sent by a network device. The first control information includes first sidelink grant information and first hybrid automatic repeat request (HARQ) information. The first sidelink grant information indicates a resource used for sidelink communication. The first HARQ information includes a first HARQ process identifier (ID) and first indication information. The first HARQ process ID is used to indicate a first HARQ process.

The first terminal device ignores the first sidelink grant information if the first indication information indicates retransmission and the first terminal device has successfully sent a transport block corresponding to the first HARQ process to a second terminal device.

Embodiment 2: According to the method in Embodiment 1, the method further includes: The first terminal device sends second indication information to the network device. The second indication information is used to indicate that the transport block corresponding to the first HARQ process has been successfully sent.

Embodiment 3: According to the method in Embodiment 2, that the first terminal device sends second indication information to the network device includes:

A first HARQ entity of the first terminal device indicates a physical layer to generate the second indication information. The first HARQ entity is used for sidelink communication. The physical layer generates the second indication information, and sends the second indication information to the network device.

Embodiment 4: According to the method in Embodiment 2, that the first terminal device sends second indication information to the network device includes:

A second HARQ process of the first terminal device indicates a physical layer to generate the second indication information. The second HARQ process is a HARQ process maintained by a first HARQ entity. The first HARQ entity is used for sidelink communication. The physical layer generates the second indication information, and sends the second indication information to the network device.

Embodiment 5: According to the method in Embodiment 1, after the first terminal device receives the first control information sent by the network device, and before the first terminal device ignores the first sidelink grant information, a first HARQ entity obtains a parameter value of a first parameter associated with the first HARQ process. The first HARQ entity is used for sidelink communication.

If the parameter value of the first parameter associated with the first HARQ process is a first value, the first HARQ entity determines that the first terminal device has successfully sent the transport block corresponding to the first HARQ process to the second terminal device.

The first value is used to indicate that HARQ feedback information for the transport block corresponding to the first HARQ process is an acknowledgement ACK.

That the first terminal device ignores the first sidelink grant information includes:

The first HARQ entity ignores the first sidelink grant information.

Embodiment 6: According to the method in Embodiment 5, the method further includes:

If the parameter value of the first parameter associated with the first HARQ process is a second value, the first HARQ entity determines that the first terminal device fails to send the transport block corresponding to the first HARQ process to the second terminal device.

The second value is used to indicate that the HARQ feedback information for the transport block corresponding to the first HARQ process is a negative acknowledgement (NACK).

Embodiment 7: According to the method in Embodiment 1, after the first terminal device receives the first control information sent by the network device, and before the first terminal device ignores the first sidelink grant information, a first HARQ entity determines whether the first HARQ process is associated with a HARQ process maintained by the first HARQ entity. The first HARQ entity is used for sidelink communication.

If no, the first HARQ entity determines that the first terminal device has successfully sent the transport block corresponding to the first HARQ process to the second terminal device.

That the first terminal device ignores the first sidelink grant information includes:

The first HARQ entity ignores the first sidelink grant information.

Embodiment 8: According to the method in Embodiment 4, after the first terminal device receives the first control information sent by the network device, and before the first terminal device ignores the first sidelink grant information, the method further includes:

The first HARQ entity determines whether the first HARQ process is associated with the HARQ process maintained by the first HARQ entity.

If no, the first HARQ entity allocates the second HARQ process, and delivers the first sidelink grant information to the second HARQ process.

If a buffer corresponding to the second HARQ process is empty, the second HARQ process determines that the first terminal device has successfully sent the transport block corresponding to the first HARQ process to the second terminal device.

That the first terminal device ignores the first sidelink grant information includes:

The second HARQ process ignores the first sidelink grant information.

Embodiment 9: According to the method in Embodiment 8, before the first HARQ entity determines whether the first HARQ process is associated with the HARQ process maintained by the first HARQ entity, the first HARQ entity determines that the first indication information indicates retransmission.

After the first HARQ entity allocates the second HARQ process, and before the second HARQ process determines that the first terminal device has successfully sent the transport block corresponding to the first HARQ process to the second terminal device, the first HARQ entity indicates retransmission to the second HARQ process. The second HARQ process determines whether the buffer corresponding to the second HARQ process is empty.

Embodiment 10: According to the method in Embodiment 8, after the first HARQ entity allocates the second HARQ process, and before the second HARQ process determines that the first terminal device has successfully sent the transport block corresponding to the first HARQ process to the second terminal device, the first HARQ entity delivers the first HARQ information to the second HARQ process.

The second HARQ process determines, based on the first HARQ information, that the first indication information indicates retransmission.

The second HARQ process determines whether the buffer corresponding to the second HARQ process is empty.

Embodiment 11: A communications apparatus is provided, including a communications module and a processing module.

The communications module is configured to receive first control information sent by a network device. The first control information includes first sidelink grant information and first hybrid automatic repeat request (HARQ) information. The first sidelink grant information indicates a resource used for sidelink communication. The first HARQ information includes a first HARQ process identifier (ID) and first indication information. The first HARQ process ID is used to indicate a first HARQ process.

The processing module is configured to ignore the first sidelink grant information if the first indication information indicates retransmission and the communications module has successfully sent a transport block corresponding to the first HARQ process to a second terminal device.

Embodiment 12: According to the apparatus in Embodiment 11, the communications module is further configured to:

send second indication information to the network device, where the second indication information is used to indicate that the transport block corresponding to the first HARQ process has been successfully sent.

Embodiment 13: According to the apparatus in Embodiment 12, the processing module further includes a first HARQ entity, and the first HARQ entity is used for sidelink communication.

The first HARQ entity is configured to indicate the communications module to generate the second indication information at a physical layer.

Before sending the second indication information to the network device, the communications module is further configured to generate the second indication information at the physical layer.

Embodiment 14: According to the apparatus in Embodiment 12, the processing module further includes a first HARQ entity. The first HARQ entity is used for sidelink communication. A HARQ process maintained by the first HARQ entity includes a second HARQ process.

The second HARQ process is configured to indicate the communications module to generate the second indication information at a physical layer.

Before sending the second indication information to the network device, the communications module is further configured to generate the second indication information at the physical layer.

Embodiment 15: According to the apparatus in Embodiment 11, the processing module further includes a first HARQ entity, and the first HARQ entity is used for sidelink communication.

The first HARQ entity is configured to:

after the communications module receives the first control information sent by the network device, and before the processing module ignores the first sidelink grant information, obtain a parameter value of a first parameter associated with the first HARQ process; and if the parameter value of the first parameter associated with the first HARQ process is a first value, determine that the communications module has successfully sent the transport block corresponding to the first HARQ process to the second terminal device.

The first value is used to indicate that HARQ feedback information for the transport block corresponding to the first HARQ process is an acknowledgement ACK.

That the processing module is configured to ignore the first sidelink grant information includes:

The first HARQ entity is configured to ignore the first sidelink grant information.

Embodiment 16: According to the apparatus in Embodiment 15, the first HARQ entity is further configured to:

if the parameter value of the first parameter associated with the first HARQ process is a second value, determine that the communications module fails to send the transport block corresponding to the first HARQ process to the second terminal device.

The second value is used to indicate that the HARQ feedback information for the transport block corresponding to the first HARQ process is a negative acknowledgement (NACK).

Embodiment 17: According to the apparatus in Embodiment 11, the processing module includes a first HARQ entity, and the first HARQ entity is used for sidelink communication.

The first HARQ entity is configured to:
after the communications module receives the first control information sent by the network device, and before the processing module ignores the first sidelink grant information, determine whether the first HARQ process is associated with a HARQ process maintained by the first HARQ entity; and if no, determine that the communications module has successfully sent the transport block corresponding to the first HARQ process to the second terminal device.

That the processing module is configured to ignore the first sidelink grant information includes:
The first HARQ entity is configured to ignore the first sidelink grant information.

Embodiment 18: According to the apparatus in Embodiment 14, the processing module includes a first HARQ entity, and the first HARQ entity is used for sidelink communication.

The first HARQ entity is configured to:
after the communications module receives the first control information sent by the network device, and before the processing module ignores the first sidelink grant information, determine whether the first HARQ process is associated with the HARQ process maintained by the first HARQ entity; and if no, allocate the second HARQ process, and deliver the first sidelink grant information to the second HARQ process.

The second HARQ process is further configured to:
if a buffer corresponding to the second HARQ process is empty, determine that the communications module has successfully sent the transport block corresponding to the first HARQ process to the second terminal device.

That the processing module is configured to ignore the first sidelink grant information includes:
The second HARQ process is configured to ignore the first sidelink grant information.

Embodiment 19: According to the apparatus in Embodiment 18, the first HARQ entity is further configured to:
before determining whether the first HARQ process is associated with the HARQ process maintained by the first HARQ entity, determine that the first indication information indicates retransmission; and
after allocating the second HARQ process, indicate retransmission to the second HARQ process.

The second HARQ process is further configured to:
after receiving the retransmission indication from the first HARQ entity, determine whether the buffer corresponding to the second HARQ process is empty.

Embodiment 20: According to the apparatus in Embodiment 18, the first HARQ entity is further configured to:
after allocating the second HARQ process, deliver the first HARQ information to the second HARQ process.

The second HARQ process is further configured to:
determine, based on the first HARQ information, that the first indication information indicates retransmission; and determine whether the buffer corresponding to the second HARQ process is empty.

Embodiment 21: A communications apparatus is provided, including a processor and a memory. The processor is coupled to the memory, the memory stores computer program instructions, and when the processor executes the computer program instructions, the apparatus is enabled to perform the method in any one of Embodiments 1 to 10.

Embodiment 22: A computer-readable storage medium is provided. The computer-readable storage medium includes computer program instructions, and when the computer program instructions are run on a computer, the computer is enabled to perform the method in any one of Embodiments 1 to 10.

Embodiment 23: A chip is provided. The chip is coupled to a memory, and the chip is configured to invoke and run computer program instructions stored in the memory, to perform the method in any one of Embodiments 1 to 10.

Embodiment 24: A computer program product is provided. When the computer program product is run on a computer, the computer is enabled to perform the method in any one of Embodiments 1 to 10.

Embodiment 25: A hybrid automatic repeat request processing method is provided, including:

A first terminal device receives first sidelink information sent by a first HARQ process of a second terminal device. The first sidelink information includes first sidelink control information and a first transport block. The first sidelink control information includes first HARQ information. The first HARQ information includes a first HARQ process ID and first indication information. The first HARQ process ID is used to indicate a first HARQ process.

The first terminal device skips decoding the first transport block if the first indication information indicates retransmission and the first terminal device has successfully received the first transport block from the first HARQ process.

Embodiment 26: According to the method in Embodiment 25, the method further includes:

The first terminal device sends second indication information to the second terminal device. The second indication information is used to indicate that the first transport block has been successfully received.

Embodiment 27: According to the method in Embodiment 26, that the first terminal device sends second indication information to the second terminal device includes:

A first HARQ entity of the first terminal device indicates a physical layer to generate the second indication information. The first HARQ entity is used for sidelink communication. The physical layer generates the second indication information, and sends the second indication information to a network device.

Embodiment 28: According to the method in Embodiment 26, that the first terminal device sends second indication information to the second terminal device includes:

A second HARQ process of the first terminal device indicates a physical layer to generate the second indication information. The second HARQ process is a HARQ process maintained by a first HARQ entity, and the first HARQ entity is used for sidelink communication. The physical layer generates the second indication information, and sends the second indication information to a network device.

Embodiment 29: According to the method in Embodiment 25, after the first terminal device receives the first sidelink information sent by the first HARQ process of the second terminal device, and before the first terminal device skips decoding the first transport block, a first HARQ entity obtains a parameter value of a first parameter associated with the first HARQ process. The first HARQ entity is used for sidelink communication.

If the parameter value of the first parameter associated with the first HARQ process is a first value, the first HARQ entity determines that the first transport block has been successfully received.

The first value is used to indicate that the first terminal device successfully decodes the first transport block received from the first HARQ process.

That the first terminal device skips decoding the first transport block includes:

The first HARQ entity skips decoding the first transport block.

Embodiment 30: According to the method in Embodiment 29, the method further includes:

If the parameter value of the first parameter associated with the first HARQ process is a second value, the first HARQ entity determines that the first transport block fails to be received. The second value is used to indicate that the first terminal device fails to decode the first transport block received from the first HARQ process.

Embodiment 31: According to the method in Embodiment 25, after the first terminal device receives the first sidelink information sent by the first HARQ process of the second terminal device, and before the first terminal device skips decoding the first transport block, a first HARQ entity determines whether the first HARQ process is associated with a HARQ process maintained by the first HARQ entity. The first HARQ entity is used for sidelink communication. If no, the first HARQ entity determines that the first transport block has been successfully received.

That the first terminal device skips decoding the first transport block includes:

The first HARQ entity skips decoding the first transport block.

Embodiment 32: According to the method in Embodiment 28, after the first terminal device receives the first sidelink information sent by the first HARQ process of the second terminal device, and before the first terminal device skips decoding the first transport block, the first HARQ entity determines whether the first HARQ process is associated with a HARQ process maintained by the first HARQ entity.

If the first HARQ process is not associated with the HARQ process maintained by the first HARQ entity, the first HARQ entity allocates the second HARQ process, and delivers the first transport block to the second HARQ process.

If a buffer corresponding to the second HARQ process is empty, the second HARQ process determines that the first transport block has been successfully received.

That the first terminal device skips decoding the first transport block includes:

The second HARQ process skips decoding the first transport block.

Embodiment 33: According to the method in Embodiment 32, before the first HARQ entity determines whether the first HARQ process is associated with the HARQ process maintained by the first HARQ entity, the first HARQ entity determines that the first indication information indicates retransmission. After the first HARQ entity allocates the second HARQ process, and before the second HARQ process determines that the first transport block has been successfully received, the first HARQ entity indicates retransmission to the second HARQ process. The second HARQ process determines whether the buffer corresponding to the second HARQ process is empty.

Embodiment 34: According to the method in Embodiment 32, after the first HARQ entity allocates the second HARQ process, and before the second HARQ process determines that the first transport block has been successfully received, the first HARQ entity delivers the first HARQ information to the second HARQ process. The second HARQ process determines, based on the first HARQ information, that the first indication information indicates retransmission. The second HARQ process determines whether the buffer corresponding to the second HARQ process is empty.

Embodiment 35: A communications apparatus is provided, including a processing module and a communications module.

The communications module is configured to receive first sidelink information sent by a first HARQ process of a second terminal device. The first sidelink information includes first sidelink control information and a first transport block.

The first sidelink control information includes first HARQ information, the first HARQ information includes a first HARQ process ID and first indication information, and the first HARQ process ID is used to indicate a first HARQ process.

The processing module is configured to skip decoding the first transport block if the first indication information indicates retransmission and the communications module has successfully received the first transport block from the first HARQ process.

Embodiment 36: According to the apparatus in Embodiment 35, the communications module is further configured to send second indication information to the second terminal device. The second indication information is used to indicate that the first transport block has been successfully received.

Embodiment 37: According to the apparatus in Embodiment 36, the processing module further includes a first HARQ entity, and the first HARQ entity is used for sidelink communication. The first HARQ entity is configured to indicate the communications module to generate the second indication information at a physical layer. The communications module generates the second indication information at the physical layer, and sends the second indication information to a network device.

Embodiment 38: According to the apparatus in Embodiment 37, the processing module further includes a first HARQ entity. The first HARQ entity is used for sidelink communication. A HARQ process maintained by the first HARQ entity includes a second HARQ process. The second HARQ process is configured to indicate the communications module to generate the second indication information at a physical layer. The communications module generates the second indication information at the physical layer, and sends the second indication information to a network device.

Embodiment 39: According to the apparatus in Embodiment 35, the processing module further includes a first HARQ entity, and the first HARQ entity is used for sidelink communication. The first HARQ entity is configured to:

after the communications module receives the first sidelink information from the first HARQ process, obtain a parameter value of a first parameter associated with the first HARQ process; if the parameter value of the first parameter associated with the first HARQ process is a first value, determine that the first transport block has been successfully received; and skip decoding the first transport block, where the first value is used to indicate that the first terminal device successfully decodes the first transport block received from the first HARQ process.

Embodiment 40: According to the apparatus in Embodiment 39, the first HARQ entity is further configured to:

if the parameter value of the first parameter associated with the first HARQ process is a second value, determine that the first transport block fails to be received, where the second value is used to indicate that the first terminal device fails to decode the first transport block received from the first HARQ process.

Embodiment 41: According to the apparatus in Embodiment 35, the processing module further includes a first HARQ entity, and the first HARQ entity is used for sidelink communication. The first HARQ entity is configured to:
after the communications module receives the first sidelink information sent by the first HARQ process of the second terminal device, determine whether the first HARQ process is associated with a HARQ process maintained by the first HARQ entity; if no, determine that the first transport block has been successfully received; and skip decoding the first transport block.

Embodiment 42: According to the apparatus in Embodiment 38, the processing module further includes a first HARQ entity, and the first HARQ entity is used for sidelink communication. The first HARQ entity is configured to:
after the communications module receives the first sidelink information sent by the first HARQ process of the second terminal device, determine whether the first HARQ process is associated with a HARQ process maintained by the first HARQ entity; and
if the first HARQ process is not associated with the HARQ process maintained by the first HARQ entity, allocate the second HARQ process, and deliver the first transport block to the second HARQ process.
The second HARQ process is configured to:
if a buffer corresponding to the second HARQ process is empty, determine that the first transport block has been successfully received; and skip decoding the first transport block.

Embodiment 43: According to the apparatus in Embodiment 42, the first HARQ entity is further configured to:
before determining whether the first HARQ process is associated with the HARQ process maintained by the first HARQ entity, determine that the first indication information indicates retransmission; and allocate the second HARQ process, deliver the first transport block to the second HARQ process, and indicate retransmission to the second HARQ process.
The second HARQ process is further configured to: after receiving the retransmission indication from the first HARQ entity, determine whether the buffer corresponding to the second HARQ process is empty.

Embodiment 44: According to the apparatus in Embodiment 42, the first HARQ entity is further configured to:
after allocating the second HARQ process, deliver the first HARQ information and the first transport block to the second HARQ process.
The second HARQ process is configured to determine, based on the first HARQ information, that the first indication information indicates retransmission; and determine whether the buffer corresponding to the second HARQ process is empty.

Embodiment 45: A communications apparatus is provided, including a processor and a memory. The processor is coupled to the memory, the memory stores computer program instructions, and when the processor executes the computer program instructions, the apparatus is enabled to perform the method in any one of Embodiments 25 to 34.

Embodiment 46: A computer-readable storage medium is provided. The computer-readable storage medium includes computer program instructions, and when the computer program instructions are run on a computer, the computer is enabled to perform the method in any one of Embodiments 25 to 34.

Embodiment 47: A chip is provided. The chip is coupled to a memory, and the chip is configured to invoke and run computer program instructions stored in the memory, to perform the method in any one of Embodiments 25 to 34.

Embodiment 48: A computer program product is provided. When the computer program product is run on a computer, the computer is enabled to perform the method in any one of Embodiments 25 to 34.

Although this application is described with reference to the embodiments, a person skilled in the art may understand and implement another variation of the disclosed embodiments by viewing the accompanying drawings, the disclosed content, and the appended claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

What is claimed is:

1. A hybrid automatic repeat request processing method, comprising:
receiving, by a first terminal device, first control information sent by a network device, wherein the first control information comprises first sidelink grant information and first hybrid automatic repeat request (HARQ) information, the first sidelink grant information indicates a resource used for sidelink communication, the first HARQ information comprises a first HARQ process identifier (ID) of a first HARQ process and first indication information;
determining, by the first terminal device, that the first terminal device has successfully sent a transport block corresponding to the first HARQ process to a second terminal device, when the first HARQ process ID is not associated with a HARQ process maintained by a first HARQ entity of the first terminal device; and
ignoring, by the first terminal device, the first sidelink grant information when the first indication information indicates retransmission and the first terminal device has successfully sent the transport block corresponding to the first HARQ process to the second terminal device;
wherein the first HARQ entity is used for sidelink communication.

2. The method according to claim 1, further comprising:
sending, by the first terminal device, second indication information to the network device, wherein the second indication information indicates that a transport block corresponding to the first HARQ process has been successfully sent.

3. The method according to claim 2, wherein the sending, by the first terminal device, second indication information to the network device comprises:
indicating, by the first HARQ entity of the first terminal device, a physical layer of the first terminal device to generate the second indication information; and
generating, by the physical layer, the second indication information, and sending the second indication information to the network device.

4. The method according to claim 2, wherein the sending, by the first terminal device, second indication information to the network device comprises:

indicating, by a second HARQ process of the first terminal device, a physical layer to generate the second indication information, wherein the second HARQ process is a HARQ process maintained by the first HARQ entity; and generating, by the physical layer of the first terminal device, the second indication information, and sending the second indication information to the network device.

5. The method according to claim 1, wherein after the receiving, by a first terminal device, first control information sent by a network device, and before the ignoring, by the first terminal device, the first sidelink grant information, the method further comprises:

obtaining, by the first HARQ entity of the first terminal device, a parameter value of a first parameter associated with the first HARQ process; and when the parameter value of the first parameter associated with the first HARQ process is a first value, determining, by the first HARQ entity, that the first terminal device has successfully sent the transport block corresponding to the first HARQ process to the second terminal device, wherein the first value indicates that HARQ feedback information for the transport block corresponding to the first HARQ process is an acknowledgement (ACK); and the ignoring, by the first terminal device, the first sidelink grant information comprises:

ignoring, by the first HARQ entity, the first sidelink grant information.

6. The method according to claim 5, further comprising:

when the parameter value of the first parameter associated with the first HARQ process is a second value, determining, by the first HARQ entity, that the first terminal device fails to send the transport block corresponding to the first HARQ process to the second terminal device, wherein the second value indicates that the HARQ feedback information for the transport block corresponding to the first HARQ process is a negative acknowledgement (NACK).

7. The method according to claim 4, wherein after the receiving, by a first terminal device, first control information sent by a network device, and before the ignoring, by the first terminal device, the first sidelink grant information, the method further comprises:

determining, by the first HARQ entity, whether the first HARQ process is associated with the HARQ process maintained by the first HARQ entity;

when the first HARQ process is not associated with the HARQ process maintained by the first HARQ entity, allocating, by the first HARQ entity, the second HARQ process, and delivering the first sidelink grant information to the second HARQ process; and when a buffer corresponding to the second HARQ process is empty, determining, by the second HARQ process, that the first terminal device has successfully sent the transport block corresponding to the first HARQ process to the second terminal device; and the ignoring, by the first terminal device, the first sidelink grant information comprises:

ignoring, by the second HARQ process, the first sidelink grant information.

8. The method according to claim 7, wherein before the determining, by the first HARQ entity, whether the first HARQ process is associated with the HARQ process maintained by the first HARQ entity, the method further comprises:

determining, by the first HARQ entity, that the first indication information indicates retransmission; and after the allocating, by the first HARQ entity, the second HARQ process, and before the determining, by the second HARQ process, that the first terminal device has successfully sent the transport block corresponding to the first HARQ process to the second terminal device, the method further comprises:

indicating, by the first HARQ entity, retransmission to the second HARQ process; and determining, by the second HARQ process, whether the buffer corresponding to the second HARQ process is empty.

9. The method according to claim 7, wherein after the allocating, by the first HARQ entity, the second HARQ process, and before the determining, by the second HARQ process, that the first terminal device has successfully sent the transport block corresponding to the first HARQ process to the second terminal device, the method further comprises:

delivering, by the first HARQ entity, the first HARQ information to the second HARQ process;

determining, by the second HARQ process based on the first HARQ information, that the first indication information indicates retransmission; and determining, by the second HARQ process, whether the buffer corresponding to the second HARQ process is empty.

10. A communications apparatus, comprising at least one processor and a memory, wherein the at least one processor is coupled to the memory, the memory stores computer program instructions that, when executed by the at least one processor, enable the apparatus to perform operations comprising:

receiving first control information sent by a network device, wherein the first control information comprises first sidelink grant information and first hybrid automatic repeat request (HARQ) information, the first sidelink grant information indicates a resource used for sidelink communication, the first HARQ information comprises a first HARQ process identifier (ID) of a first HARQ process and first indication information;

determining that a transport block corresponding to the first HARQ process has been successfully sent to a second terminal device, when the first HARQ process ID is not associated with a HARQ process maintained by a first HARQ entity of the communications apparatus; and ignoring the first sidelink grant information when the first indication information indicates retransmission and the transport block corresponding to the first HARQ process has been successfully sent to the second terminal device;

wherein the first HARQ entity is used for sidelink communication.

11. The communications apparatus according to claim 10, wherein the operations further comprise:

sending second indication information to the network device, wherein the second indication information indicates that a transport block corresponding to the first HARQ process has been successfully sent.

12. The communications apparatus according to claim 11, wherein the sending second indication information to the network device comprises:

indicating, by the first HARQ entity of the communications apparatus, a physical layer of the communications apparatus to generate the second indication information; and generating, by the physical layer, the second indication information, and sending the second indication information to the network device.

13. The communications apparatus according to claim 11, wherein the sending second indication information to the network device comprises:

indicating, by a second HARQ process of the communications apparatus, a physical layer of the communications apparatus to generate the second indication information, wherein the second HARQ process is a HARQ process maintained by the first HARQ entity; and generating, by the physical layer, the second indication information, and sending the second indication information to the network device.

14. The communications apparatus according to claim 10, wherein after receiving first control information sent by the network device, and before ignoring the first sidelink grant information, the operations further comprise:

obtaining, by the first HARQ entity of the communications apparatus, a parameter value of a first parameter associated with the first HARQ process; and when the parameter value of the first parameter associated with the first HARQ process is a first value, determining, by the first HARQ entity, that the communications apparatus has successfully sent the transport block corresponding to the first HARQ process to the second terminal device, wherein the first value indicates that HARQ feedback information for the transport block corresponding to the first HARQ process is an acknowledgement (ACK); and the ignoring the first sidelink grant information comprises:

ignoring, by the first HARQ entity, the first sidelink grant information.

15. The communications apparatus according to claim 14, wherein the operations further comprise:

when the parameter value of the first parameter associated with the first HARQ process is a second value, determining, by the first HARQ entity, that the communications apparatus fails to send the transport block corresponding to the first HARQ process to the second terminal device, wherein the second value indicates that the HARQ feedback information for the transport block corresponding to the first HARQ process is a negative acknowledgement (NACK).

16. The communications apparatus according to claim 13, wherein after the receiving first control information sent by a network device, and before the ignoring the first sidelink grant information, the operations further comprise:

determining, by the first HARQ entity, whether the first HARQ process is associated with the HARQ process maintained by the first HARQ entity;

when the first HARQ process is not associated with the HARQ process maintained by the first HARQ entity, allocating, by the first HARQ entity, the second HARQ process, and delivering the first sidelink grant information to the second HARQ process; and when a buffer corresponding to the second HARQ process is empty, determining, by the second HARQ process, that the communications apparatus has successfully sent the transport block corresponding to the first HARQ process to the second terminal device; and the ignoring the first sidelink grant information comprises:

ignoring, by the second HARQ process, the first sidelink grant information.

17. The communications apparatus according to claim 16, wherein before the determining, by the first HARQ entity, whether the first HARQ process is associated with the HARQ process maintained by the first HARQ entity, the operations further comprise:

determining, by the first HARQ entity, that the first indication information indicates retransmission; and after the allocating, by the first HARQ entity, the second HARQ process, and before the determining, by the second HARQ process, that the communications apparatus has successfully sent the transport block corresponding to the first HARQ process to the second terminal device, the operations further comprise:

indicating, by the first HARQ entity, retransmission to the second HARQ process; and determining, by the second HARQ process, whether the buffer corresponding to the second HARQ process is empty.

18. The communications apparatus according to claim 16, wherein after the allocating, by the first HARQ entity, the second HARQ process, and before the determining, by the second HARQ process, that the communications apparatus has successfully sent the transport block corresponding to the first HARQ process to the second terminal device, the operations further comprise:

delivering, by the first HARQ entity, the first HARQ information to the second HARQ process;

determining, by the second HARQ process based on the first HARQ information, that the first indication information indicates retransmission; and determining, by the second HARQ process, whether the buffer corresponding to the second HARQ process is empty.

19. A non-volatile computer-readable storage medium, storing computer program instructions that, when executed by at least one processor, control a communication apparatus to perform operations comprising:

receiving first control information sent by a network device, wherein the first control information comprises first sidelink grant information and first hybrid automatic repeat request (HARQ) information, the first sidelink grant information indicates a resource used for sidelink communication, the first HARQ information comprises a first HARQ process identifier (ID) of a first HARQ process and first indication information;

determining that a transport block corresponding to the first HARQ process has been successfully sent to a second terminal device, when the first HARQ process ID is not associated with a HARQ process maintained by a first HARQ entity of the communications apparatus, and ignoring the first sidelink grant information when the first indication information indicates retransmission and the transport block corresponding to the first HARQ process has been successfully sent to the second terminal device;

wherein the first HARQ entity is used for sidelink communication.

20. The non-volatile computer-readable storage medium according to claim 19, wherein the computer program instructions include instructions that control the at least one processor to further perform operations comprising:

sending second indication information to the network device, wherein the second indication information indicates that a transport block corresponding to the first HARQ process has been successfully sent.

\* \* \* \* \*